US007204753B2

(12) United States Patent
Ozaki et al.

(10) Patent No.: US 7,204,753 B2
(45) Date of Patent: Apr. 17, 2007

(54) PATTERN DISPLAY DEVICE AND GAME MACHINE INCLUDING THE SAME

(75) Inventors: Masaaki Ozaki, Kariya (JP); Takahisa Kaneko, Chiryu (JP); Ken Nishioka, Toyoake (JP); Tsuneo Uchida, Okazaki (JP); Hiroshi Kawakami, Niimi (JP); Yoshio Aoki, Niimi (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/793,720

(22) Filed: Feb. 27, 2001

(65) Prior Publication Data

US 2001/0031658 A1 Oct. 18, 2001

(30) Foreign Application Priority Data

Feb. 28, 2000 (JP) ....................................... 2000-051314
Mar. 9, 2000 (JP) ....................................... 2000-065097
Mar. 13, 2000 (JP) ....................................... 2000-068925

(51) Int. Cl.
*A63F 13/00* (2006.01)

(52) U.S. Cl. ......................................... 463/16; 273/274

(58) Field of Classification Search ................. 273/274; 463/30, 34; 345/4, 1.2
See application file for complete search history.

(56) References Cited

U.S. PATENT DOCUMENTS 4,306,768 A * 12/1981 Egging ................... 273/148 B
4,568,928 A 2/1986 Biferno
4,718,672 A * 1/1988 Okada .................... 273/143 R
5,752,881 A * 5/1998 Inoue ..................... 273/143 R
5,810,665 A * 9/1998 Takemoto et al. ............ 463/31
5,890,962 A * 4/1999 Takemoto ............... 273/143 R
6,027,115 A * 2/2000 Griswold et al. ....... 273/143 R
6,181,301 B1 * 1/2001 Inoguchi et al. ............... 345/5

FOREIGN PATENT DOCUMENTS

JP 60-61079 4/1985
JP 61-279272 12/1986
JP 2-19182 1/1990
JP 4-109977 4/1992
JP A-H04-114676 4/1992
JP A-H04-341288 11/1992

(Continued)

OTHER PUBLICATIONS

Decision of Refusal of May 10, 2005, issued from Japanese Patent Office for the corresponding Japanese application number 2000–065097 (copy of original document and English translation).

Partial English Translation of JP–A–H04–114676

Partial English Translation of JP–A–H07–124290.

Partial English Translation of JP–A–H11–24451.

Partial English Translation of JP–A–H11–137774.

Decision of Refusal of Aug. 30, 2005, issued from Japanese Patent Office for the corresponding Japanese application number 2000–051314 (copy of original document and English translation attached).

Notification of Refusal and its translation from Japanese Patent Office for corresponding Japanese patent application No. 2000–068925 dated Jul. 25, 2006.

*Primary Examiner*—V. K. Mendiratta
(74) *Attorney, Agent, or Firm*—Posz Law Group, PLC

(57) ABSTRACT

A game machines has a back side display unit composed of reels for displaying back patterns, and a front side display unit composed of transparent EL panels for displaying overlapping patterns overlapping with the back patterns. The back side display unit and the front side display unit are disposed not to produce blind spot regions of the back patterns. The game machine can provide various overlapping patterns with good visibility and a high game selection capability to a player.

39 Claims, 21 Drawing Sheets

FOREIGN PATENT DOCUMENTS

| | | |
|---|---|---|
| JP | 5-177043 | 7/1993 |
| JP | 6-39085 | 2/1994 |
| JP | A-H07-16340 | 1/1995 |
| JP | A-H07-124290 | 5/1995 |
| JP | A-H08-103541 | 4/1996 |
| JP | A-Y2-2531253 | 1/1997 |
| JP | A-H09-207625 | 8/1997 |
| JP | 10-91076 | 4/1998 |
| JP | A-H10-305130 | 11/1998 |
| JP | A-H10-328398 | 12/1998 |
| JP | A-H11-90017 | 4/1999 |
| JP | 11-99240 | 4/1999 |
| JP | A-11-137774 | 5/1999 |
| JP | A-H11-152970 | 6/1999 |
| JP | A-H11-153970 | 6/1999 |
| JP | A-11-244451 | 9/1999 |

* cited by examiner

PATTERN DISPLAY DEVICE AND GAME MACHINE INCLUDING THE SAME

CROSS REFERENCE TO RELATED APPLICATIONS

This application is based upon and claims the benefit of Japanese Patent Applications No. 2000-51314 filed on Feb. 28, 2000, No. 2000-65097 filed on Mar. 9, 2000, and No. 2000-68925 filed on Mar. 13, 2000, the contents of which are incorporated herein by reference.

BACKGROUND OF THE INVENTION

1. Field of the Invention

This invention relates to pattern display devices, and game machines including display devices.

2. Description of the Related Art

On one type of game machines, a set of moving patterns is displayed, then the motion of the patterns is stopped, and awarded items (coins and game balls) are dispensed if the resulting (stopped) set of patterns coincides with one of winning sets of patterns. On the other hand, on another type of game machines, a machine is suddenly switched to a different game condition that allows a player to earn many awarded items more easily (a condition called special play or special award). The former case (format where awarded items are dispensed according to the pattern) is represented by slot machines and the latter case is represented by ball playing machines such as pachinko machines. There is also a kind of slot machines called Pachi-suro machines (a kind of slot machines), where the game is switched to a special playing condition in addition to dispensing awarded items when a special set of pattern (e.g., 777) appears.

In many of these pattern display devices, patterns are displayed in a matrix composed of several rows and columns (e.g., three rows and three columns), and awarded items and special playing conditions are provided when the combination of patterns along a row of the matrix or a diagonal line (normally called "winning line") coincides with one of the winning sets of patterns. On a slot machine, it is common to change the number of winning lines based on an amount of bets.

Conventional pattern display devices can have either a mechanical display means where patterns are displayed by the rotation (scrolling display) and stopping (stationary display) of pattern-painted reels (drums) or belts, or an electrical display means where patterns are displayed as varying and stationary displays by means of a liquid crystal display (LCD) device, CRT, etc. Furthermore, some of them have a transparent LCD device in front of the aforementioned display means, to display the above-described winning line, or to show an advertising content or simulations when the game is not executed (Japanese Unexamined Patent Publication No. 2-19182).

The technique disclosed by Japanese Unexamined Patent Publication No. 2-19182 overlays the LCD screen display on top of the regular patterns, however, the overlaid display is composed of only winning lines and is monotonous and luck excitement for a player. The overlaid display has no bearing on the fun of a game.

SUMMARY OF THE INVENTION

The present invention has been made in view of the above problems. An object of the present invention is to make it possible to perform several kinds of overlaid displays (overlapping displays). Another object of the present invention is to provide a display device and a game machine adopting the same capable of performing several kinds of overlapping displays.

According to one aspect of the present invention, a pattern display device has a front side display unit that is disposed in front of a pattern display unit (back side display unit) capable of displaying a plurality of first display patterns. The front side display unit can display a plurality of second patterns overlapping with the first patterns, and is transparent except for the second patterns. Accordingly, the overlapping display becomes variable and flexible. If this pattern display device is applied to a game machine, the overlapping display can attract player's attention, and a high game selection capability can be provided to the player.

According to another aspect of the invention, a game machine has a back side display unit for displaying a back pattern, a transparent front side display unit disposed in front of the back side display unit, for displaying a front pattern. In the game machine, the front pattern is displayed alone or together with the back pattern to be recognized as a game target display by a player, and a game condition is determined by the game target display. The game machine can have high display variation, and the player can recognize by the game target display whether the game condition is a winning condition or not.

Preferably, the game machine has a means that notices the player that the winning condition is established. The means is, for example, a mark for indicating a winning line, the line itself, or the like. The game machine can have a means for giving a game value or an awarded item to the player when the winning condition is established. When a game value (for example, a right for executing a special game) is given to the player, the means can be composed of, for example, a control unit for setting the game machine at a special play (Bonus, Big Bonus) mode. When an awarded item is given to the player, the means can be composed of, for example, a dispenser for dispensing coins, game balls, and the like.

BRIEF DESCRIPTION OF THE DRAWINGS

Other objects and features of the present invention will become more readily apparent from a better understanding of the preferred embodiments described below with reference to the following drawings, in which.

DETAILED DESCRIPTION OF THE PREFERRED EMBODIMENTS

First Embodiment

Figure 1:
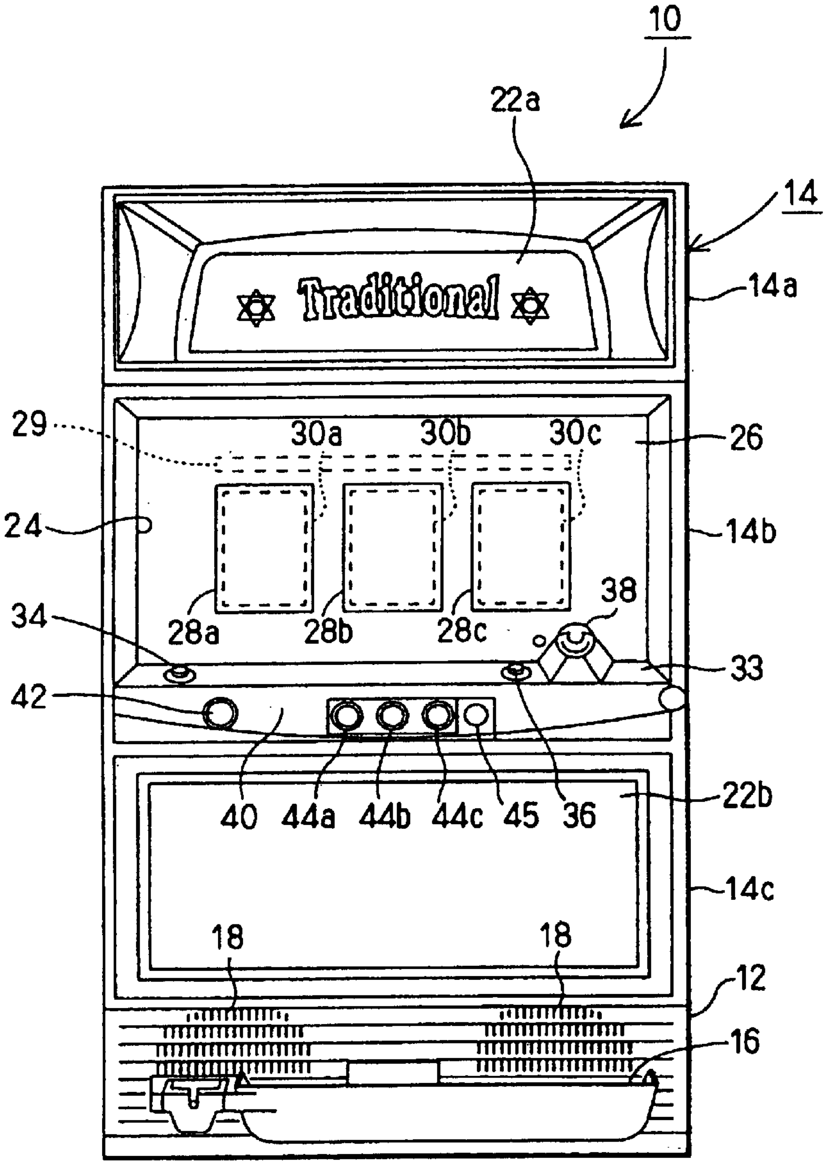
FIG. 1 is a front view showing a slot machine in a first embodiment of the invention.

A first embodiment described here is a case where the invention is materialized as a slot machine. As shown in FIG. 1, a main frame 14 is mounted on the front part of a box 12 of a slot machine 10 via a hinge (not shown), which is normally locked but can be opened like a door when it is unlocked. A receiving dish 16 is provided at the bottom of the main frame 14 and a speaker 18 is provided behind a window having several slits.

The main frame 14 is divided into a top section 14*a*, a middle section 14*b* and a bottom section 14*c*, wherein the top section 14*a* and the bottom section 14*c* are provided with decorative panels 22*a* and 22*b* respectively. Although the panel 22*a* shows the wording "Traditional" in FIG. 1, it is simply a design of the machine and does not mean a prior art. The middle section 14*b* is provided with displays of patterns and many members that can be operated by a player. Specifically, the middle section 14*b* has a square opening 24, in which a front panel 26 is fitted.

Figure 2:
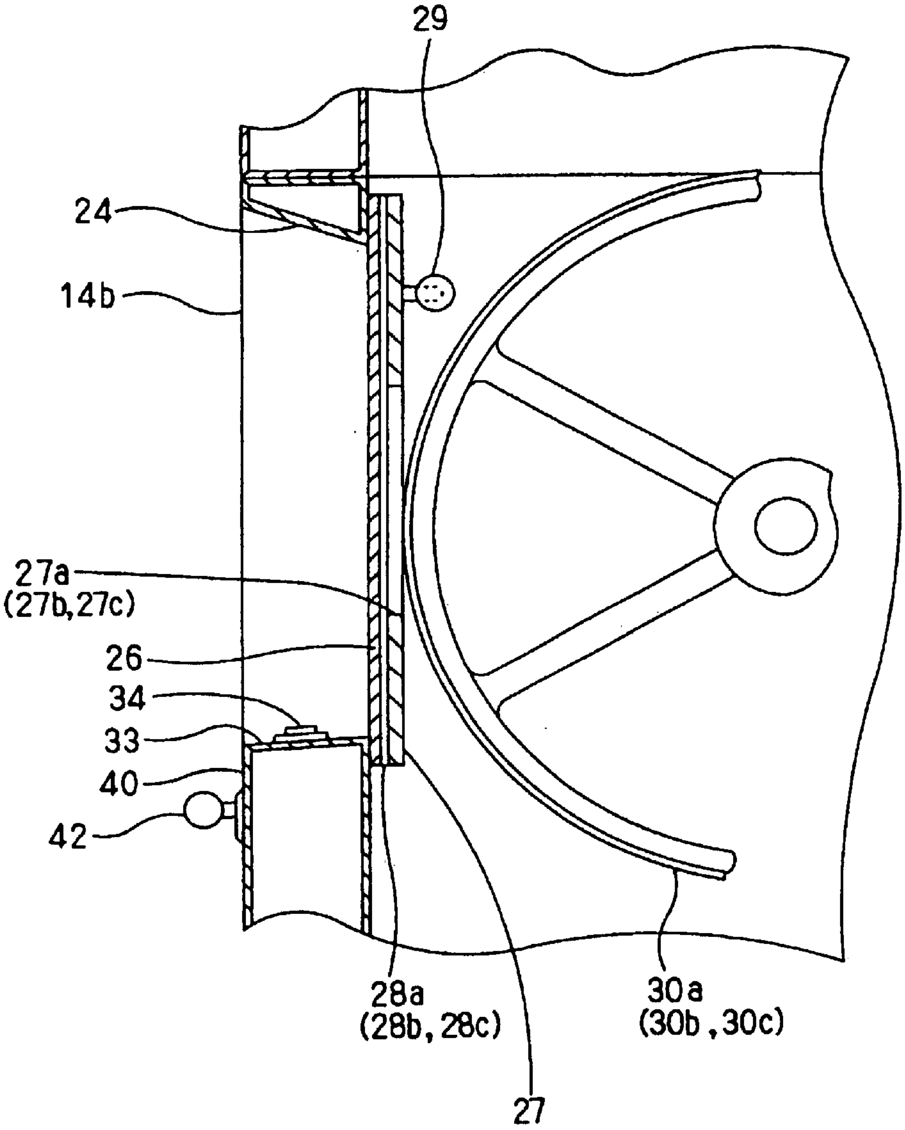
FIG. 2 is a cross-sectional view partially showing a middle part of the slot machine shown in FIG. 1.

As shown in FIG. 2, transparent EL panels 28*a*, 28*b*, and 28*c* are stacked behind the back face of the front panel 26, and an intermediate panel 27 is stacked on the back of the transparent EL panels 28*a*, 28*b*, and 28*c*. In other words, the front panel 26, the transparent EL panels 28*a*, 28*b*, and 28*c*, and the intermediate panel 27 are stacked to form an integrated three-layer structure.

Figure 10:
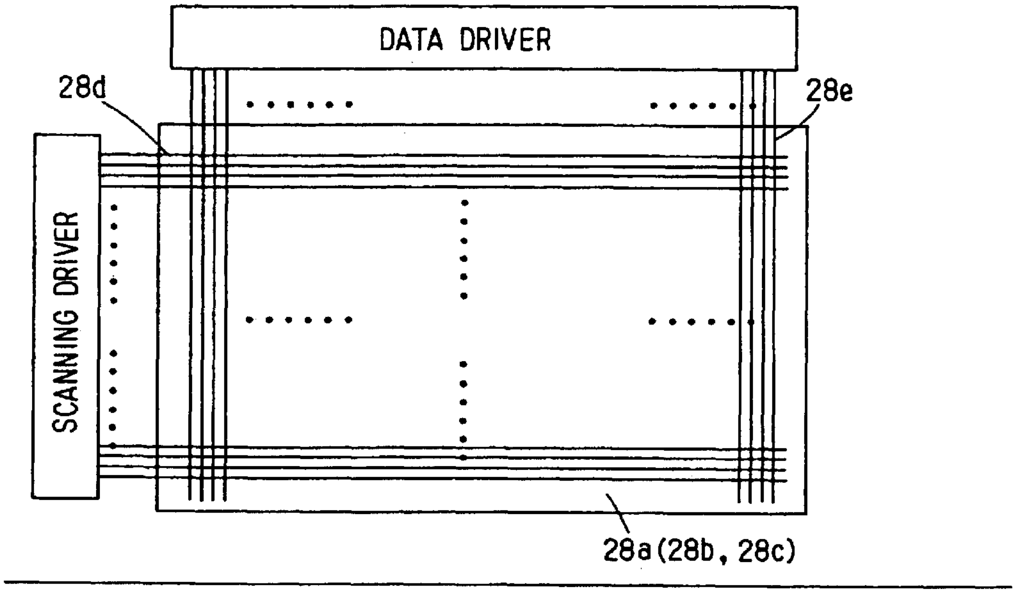
FIG. 10 is a schematic view showing a structure of one of the EL panels.

Each of the transparent EL panels 28*a*, 28*b* and 28*c* used in this embodiment is of a simple matrix type wherein, as shown in FIG. 10, scanning electrodes 28*d* and data electrodes 28*e* cross each other. However, the transparent EL panels 28*a*, 28*b*, and 28*c* may be of a segment type if the display patterns are fixed. Since the structure of the transparent EL panels 28*a*, 28*b* and 28*c* is widely known, its detailed description is omitted here. When the transparent EL panels 28*a*, 28*b* and 28*c* display characters and graphics, they can obstruct viewer's eyes.

In this embodiment, these three transparent EL panels 28*a*, 28*b*, and 28*c* constitute a front side display means (display unit). Although several transparent EL panels are used in this embodiment, it is also possible to use a single transparent EL panel that is divided into several sections.

The intermediate panel 27 is provided with three small openings 27*a*, 27*b* and 27*c* corresponding to the three transparent EL panels 28*a*, 28*b*, and 28*c*, and a fluorescent lamp 29 as an internal illumination is optionally attached to the intermediate panel 27. The intermediate panel 27 is also provided with marks indicating winning lines and decorations and is opaque except the small openings 27*a*, 27*b*, and 27*c*. On the other hand, the front panel 26 is transparent in this embodiment. Therefore, the player can see the inside of the small openings 27*a*, 27*b*, and 27*c* through the front panel 26 and the transparent EL panels 28*a*, 28*b*, and 28*c*. The front panel 26 may, however, be oblique. In this case, the front panel 26 should be formed with three windows through which the EL panels 28*a*, 28*b*, and 28*c* are visible, respectively.

At the inside of these small openings 27*a*, 27*b*, and 27*c*, reels 30*a*, 30*b* and 30*c* are provided corresponding to the transparent EL panels 28*a*, 28*b*, and 28*c*. These reels 30*a*, 30*b* and 30*c* constitute a back side display means (display unit), and the areas that can be seen through the transparent EL panels 28*a*, 28*b*, and 28*c* corresponds to back side display regions. The fluorescent lamp 29 is used to illuminate the surfaces of the reels 30*a*, 30*b* and 30*c* (i.e., back patterns 31). The detailed structures, etc., of the reels 30*a*, 30*b* and 30*c* are similar to those of conventional slot machines so that their drawings and descriptions are omitted here.

Referring back to FIG. 1, a settling switch 34, a bet switch 36, and a coin insertion port 38 are provided on the lower edge portion 33 of the opening 24. A vertical portion 40 that is adjoined to the lower edge portion 33 and extends downward in a vertical direction is provided with a start lever 42, stop switches 44*a*, 44*b*, and 44*c*, as well as an EL stop switch 45.

Figure 3:
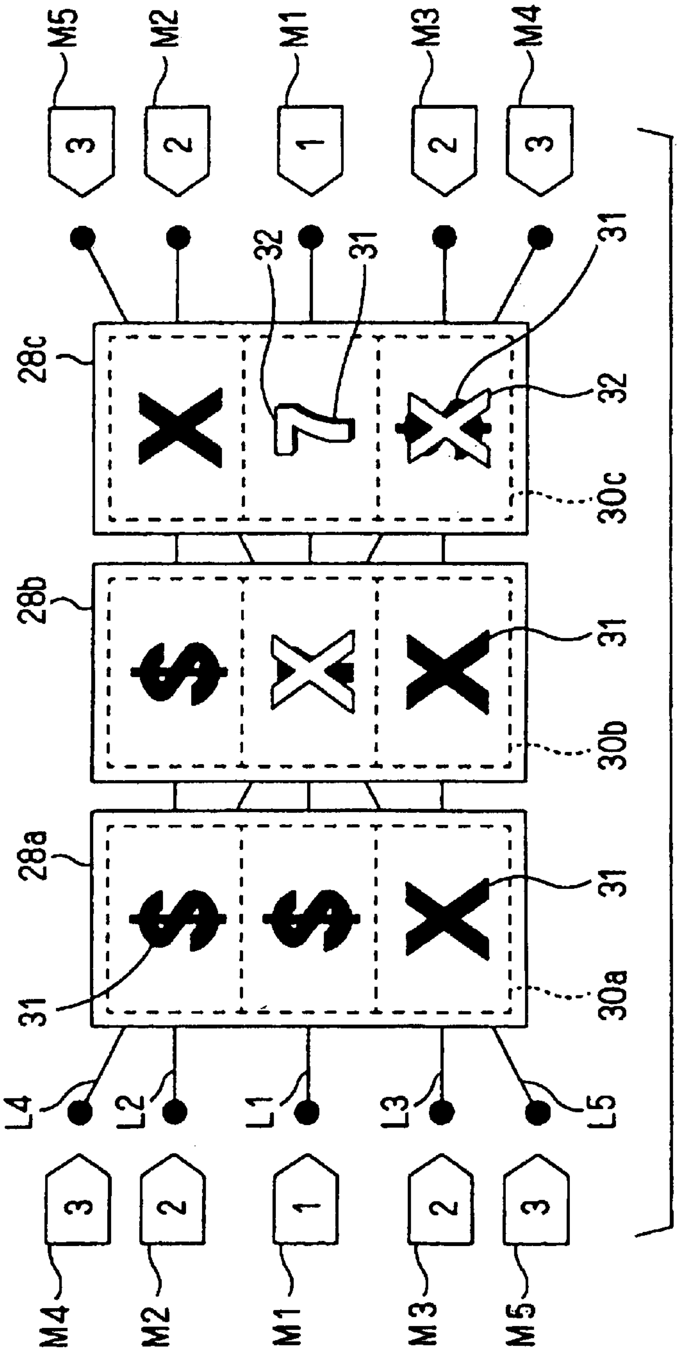
FIG. 3 is an explanatory view showing overlapping display of reels and transparent EL panels in the slot machine shown in FIG. 1.

As shown in FIG. 3, various back patterns 31 such as $, 7, X, etc., are provided on the barrel sections of the reels 30*a*, 30*b* and 30*c*. These back patterns 31 form the back side display. In this embodiment, each of these reels 30*a*, 30*b* and 30*c* has 21 back patterns 31 (though the total number of back pattern types on one reel is less than 21 as some of them are the same), and several back patterns 31 can be shown by scrolling display scrolled in a vertical direction as the reels 30*a*, 30*b* and 30*c* are rotated. When the rotations of the reels 30*a*, 30*b* and 30*c* are stopped, three back patterns 31 appear as stationary displays through the transparent EL panels 28*a*, 28*b*, and 28*c*.

Meanwhile, the transparent EL panels 28*a*, 28*b*, and 28*c* can display overlapping patterns 32 that form the front side display in the positions overlapping with the back patterns 31 when the rotations of the reels 30*a*, 30*b* and 30*c* stop (i.e., stationary displays of the back patterns 31). The overlapping patterns 32 have the same kinds of patterns as those of the back patterns 31 provided on the reels 30*a*, 30*b* and 30*c* corresponding to the transparent EL panels 28*a*, 28*b*, and 28*c*. Therefore, the overlapping patterns 32 may include a pattern the same as that of the corresponding back pattern 31 as shown in the middle row of the reel 30*c* in FIG. 3, or another pattern different from that of the corresponding back pattern 31 as shown in the bottom row of the reel 30*c*.

In this embodiment, the displayed positions of the overlapping patterns 32 are slightly offset from the displayed positions of the back patterns 31 so that the overlapping patterns 32 do not hide the back patterns 31 completely (so that the player recognizes the back patterns 31 behind them) even when an overlapping pattern 32 coincides with a back pattern 31 as shown in the middle rows of the transparent EL panel 28*c* and the reel 30*c*. Depending on game conditions, there are cases where only part (less than nine) of the overlapping patterns 32 are displayed, where all (nine) of them are displayed, and where none of them are displayed.

Line markers M1 to M5 are provided on the left side of the transparent EL panel 28*a* and on the right side of the transparent EL panel 28*c*, and they are written with numbers 3, 2, 1, 2 and 3 in that order from the top. Also provided are winning lines L1 to L5 connecting the corresponding line markers M1 to M5 on the left and right sides. These line markers M1 to M5 and winning lines L1 to L5 are drawn on the intermediate panel 27 and can be seen through the front panel 26. These line markers M1 to M5 also correspond to a display means.

Since the display regions of the transparent EL panels 28*a*, 28*b*, and 28*c* are larger than the areas of the reels 30*a*, 30*b* and 30*c* that can be viewed by the player in this embodiment, the player can view securely the display areas (the parts facing the player) of the reels 30*a*, 30*b* and 30*c* through the corresponding transparent EL panels 28*a*, 28*b*, and 28*c* even if the player's viewpoint slightly changes. The distances between the transparent EL panels 28*a*, 28*b*, and 28*c* and the reels 30*a*, 30*b* and 30*c* are chosen in such a way that the pattern of an adjacent reel (e.g., reel 30*a*) cannot be seen through a certain transparent EL panel (e.g., transparent EL panel 28*b*). In consequence, the overlapping display does not cause any confusion. Detailed explanation of this feature is presented in a second embodiment described below.

Figure 4:
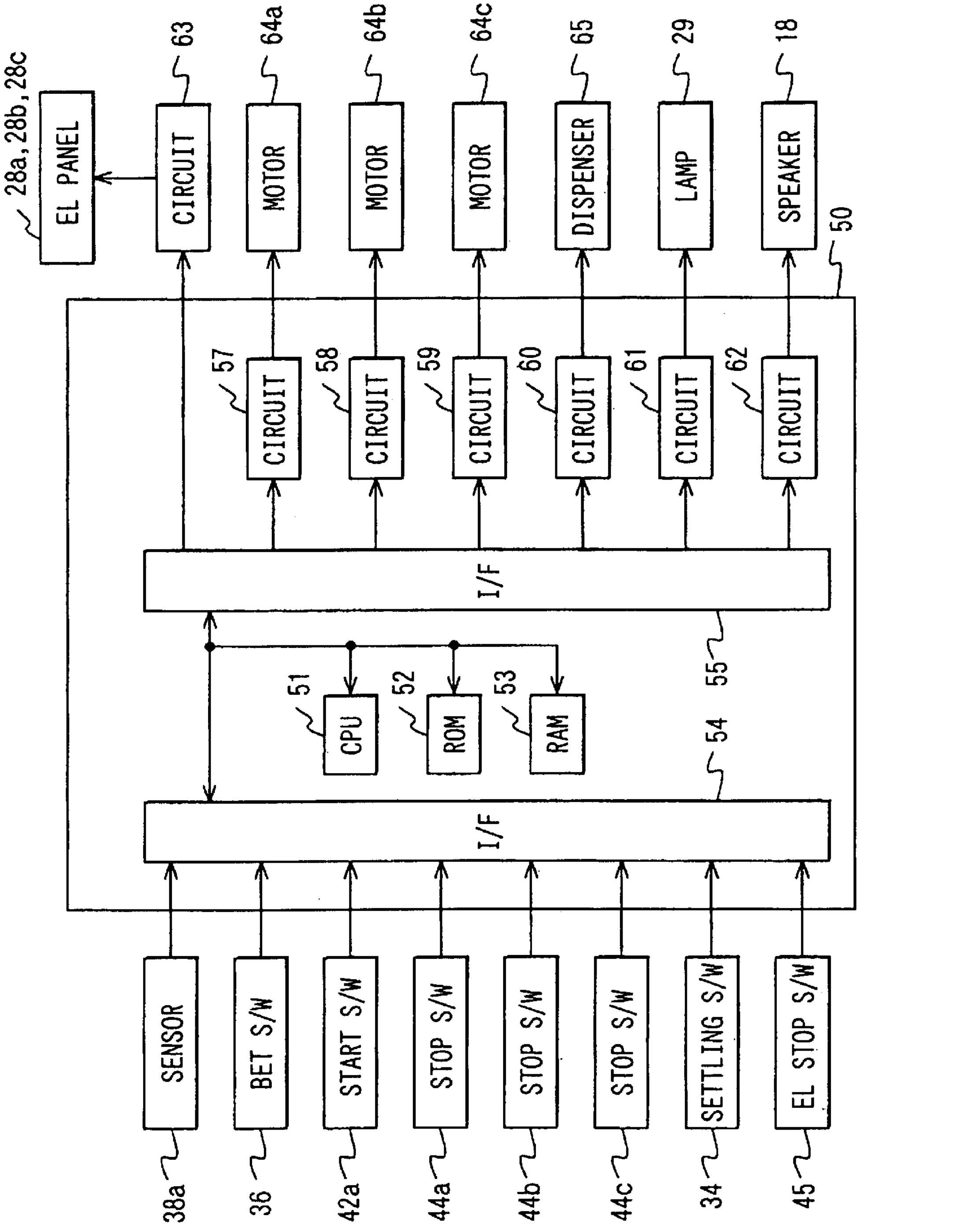
FIG. 4 is a block diagram showing a control system of the slot machine shown in FIG. 1.
Figure 5:
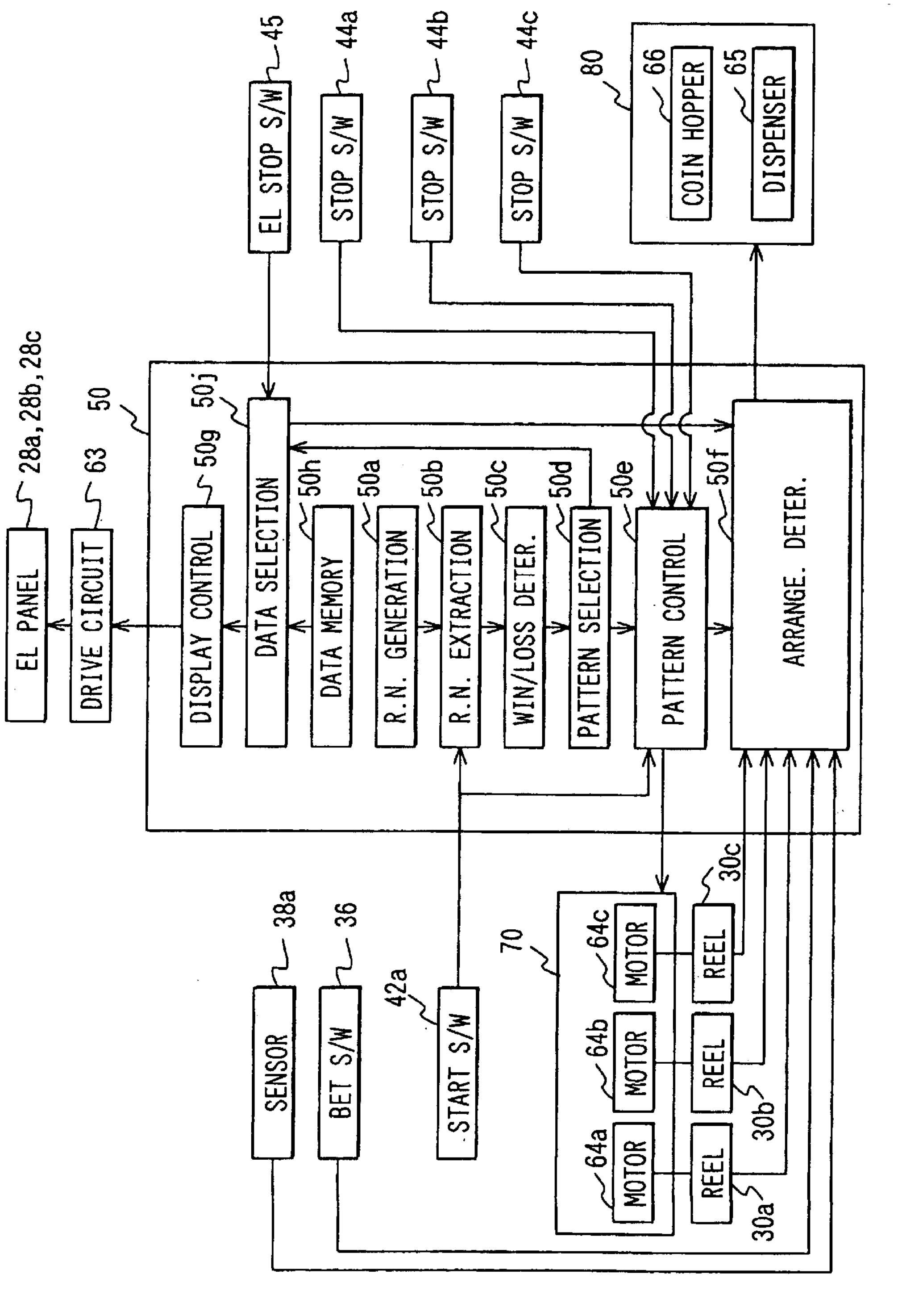
FIG. 5 is a functional block diagram showing the control system of the slot machine shown in FIG. 1.

Further, the slot machine 10 has a control system as shown in FIG. 4 and FIG. 5. Next, the hardware of the control system is explained with reference to FIG. 4.

A control unit 50 comprises a CPU 51, a ROM 52, a RAM 53, an input interface 54, an output interface 55, and drive circuits 57 to 62. The CPU 51, ROM 52, and RAM 53 constitute a one-chip microcomputer in this embodiment. The input interface 54 is connected to the settling switch 34, the bet switch 36, a coin deposit sensor 38*a* that detects coins that are inserted (deposited) from the coin insertion port 38, a start switch 42*a* that interconnects with the start lever 42, the stop switches 44*a*, 44*b*, and 44*c*, and the EL stop switch 45, so that the control unit 50 can operate by collecting information from those members.

The output interface 55 is connected to an EL drive circuit 63 that is connected to the transparent EL panels 28*a*, 28*b*, and 28*c* at the output side thereof and drives the transparent EL panels 28*a*, 28*b*, and 28*c*. The output interface 55 is also connected to the drive circuits 57 to 62, wherein the drive circuits 57, 58 and 59 are connected to motors 64*a*, 64*b* and 64*c*, respectively, the drive circuit 60 is connected to a dispenser 65, the drive circuit 61 is connected to a fluorescent lamp 29, and the drive circuit 62 is connected to the speaker 18. Thus, the control unit 50 can control the displays of the transparent EL panels 28*a*, 28*b*, and 28*c*, the operations of the motors 64*a*, 64*b* and 64*c*, the operation of the dispenser 65, turning on and off of the fluorescent lamp 29, and voice output of the speaker 18.

The control procedures by the control unit 50 (mainly by the CPU 51) are described below using FIG. 5 that shows control functions as a block diagram.

When a player deposits coins through the coin insertion port 38 to start a game, the coin deposit sensor 38*a* outputs a deposit signal each time it detects a coin, and the deposit signal is inputted into the control unit 50. The CPU 51 sets up effective winning lines L1 to L5 depending on the deposit signal, in other words, depending on the number of deposited coins (number of bets). More specifically, the winning line L1 of the middle row becomes effective when the number of bets is 1, the winning lines L2 and L3 of the upper and lower rows becomes effective when the number of bets is two, the diagonally laid out winning lines L4 and L5 becomes effective when the number of bets is three. The effective winning lines L1 to L5 are notified to the player by the corresponding line markers M1 to M5 that are turned on. The system rejects bets of more than four coins at a time.

It is also possible to deposit many coins in advance (putting them on credit) to play games. In order to play credit games, the number of bets is selected by operating the bet switch 36. One operation of the switch corresponds to one bet (coin), two operations correspond to two bets, three operations correspond to three bets, and the number of bets is subtracted from the number of credits. The method of setting the effective winning lines L1 to L5 is the same as the case of betting by means of depositing the coins each time.

Since the setting of the effective winning lines L1 to L5 is related to the determination of winning conditions, which will be described later, the setting is included in the function of the control unit 50 as an arrangement determination means 50*f*.

When the player pushes down the start lever 42 after the effective winning lines L1 to L5 are determined by depositing coins or operating the bet switch 36, the start signal from the start switch 42*a* enters the control unit 50. The CPU 51 then starts the rotation of the motors 64*a*, 64*b* and 64*c* via the drive circuits 57 to 59 (pattern control means 50*e*). This makes the reels 30*a*, 30*b* and 30*c* rotate so that the back patterns 31 are shown in a scrolling display mode. The motors 64*a*, 64*b* and 64*c* constitute a driving means 70.

After the start signal is inputted, a random number generated by a random number generation means 50*a*, for example, a software counter using a portion of the RAM 53, is read (random number extraction means 50*b*). Then, it is determined whether it is a winning condition (winning), a move to the Bonus Mode or the Big Bonus Mode, or a losing condition (loss) depending on whether the random number coincides with one of several prepared winning values (win/loss determination means 50*c*). There are several ranks of winning conditions including a winning condition for dispensing 2 coins to a winning condition for dispensing 15 coins. In this case, the start switch 42*a* corresponds to a start signal output means; and the random number generation means 50*a*, the random number extraction means 50*b*, and the win/loss determination means 50*c* constitute a lottery means. The start signal output means is not limited to one that is operable by the player, but may be one such as a sensor that is non-operable by the player.

Based on the determined result, the control unit decides a combination of the back patterns 31 to be displayed as the stationary displays when the reels 30*a*, 30*b* and 30*c* are stopped (stop pattern selection means 50*d*). In the case of winning, for example, a combination of back patterns 31 such as "diamond, diamond, diamond" or "water melon, water melon, water melon" or "cherry, cherry, cherry" or "cherry, --, --" (that is, a cherry back pattern 31 is specified for the left reel 30*a*, but no back patterns 31 are specified for the other two reels 30*b* and 30*c*) is selected. A combination of the back patterns 31, for example, "BAR, BAR, BAR" is selected as a winning condition if it decides to move to the Bonus Mode, and a combination of the back patterns 31, for example, "7, 7, 7" is selected as a winning condition if it decides to move to the Big Bonus Mode. However, which back patterns are to be shown as the stationary displays depends on the operating timings of the stop switches 44*a*, 44*b* and 44*c* by the player. Therefore, the combination of the back patterns 31 decided here is not always shown as the stationary displays.

When one of the stop switches 44*a*, 44*b* and 44*c* is operated after the reels 30*a*, 30*b* and 30*c* start to rotate, a stop signal is inputted, and the CPU 51 stops one of the reels 30*a*, 30*b* and 30*c* corresponding to the one of the stop switches 44*a*, 44*b* and 44*c* operated to thereby display a stationary back pattern 31 (pattern control means 50*e*). At that time, while the control unit 50 controls the stopping positions of the reels 30*a*, 30*b* and 30*c* to match the combination of the back patterns 31 that is decided by the stop pattern selection means 50*d*, it has to stop the reels almost instantaneously because there is a limit to the rotation amounts of the reels 30*a*, 30*b* and 30*c* before stopping from the operation of the stop switches 44*a*, 44*b* and 44*c* (because if it takes too long to stop from the switch operation, the player may become suspicious). Therefore, the combination of the back patterns 31 may not be exactly as is determined by the stop pattern selection means 50*d*. How this case is treated will be described in the part concerning the display of the transparent EL panels 28*a*, 28*b* and 28*c*.

The control unit 50 functions as a back side display control means as it starts the rotation of the reels 30*a*, 30*b* and 30*c* in response to the start signal from the start switch 42*a* (to initiate the scrolling display of the back patterns 31), and stops them in response to the operations of the stop switches 44*a*, 44*b* and 44*c* (to display the back patterns 31 in a stationary state).

When all three of the reels 30*a*, 30*b* and 30*c* stop, the CPU 51 determines whether the winning condition appears as the stationary display of the back patterns 31 on the effective winning lines based on the stopped positions of the reels 30*a*, 30*b* and 30*c*, and the dispenser 65 dispenses coins from a coin hopper 66 to the receiving dish 16 if the back patterns 31 arranged in the stationary state satisfies a winning combination (arrangement determination means 50*f*). The coin hopper 66 and the dispenser 65 thus constitute a dispensing means 80. In the case of the credit game, the number of credits is added instead of dispensing the coins. By operating the settling switch 34, the player can finish the game, and have the number of coins corresponding to the number of credits dispensed into the receiving dish 16.

At this time, if one of the special combinations as mentioned above, for example, "BAR, BAR, BAR" is formed, the game moves to the Bonus Mode, and if the combination "7, 7, 7" is formed, the game moves to the Big Bonus Mode. When the game is played under the Bonus Game or the Big Bonus Game, the chance of coinciding with the special combinations of the back patterns 31 such as "7, 7, 7" increases, hence the chance of the player winning many coins increases. Since the contents of the Bonus Game and the Big Bonus Game are publicly known, further descriptions of them are omitted here.

Next, the displays of the transparent EL panels 28*a*, 28*b* and 28*c* are explained referring to FIGS. 6, 7, 8 and 9.

The control unit 50 (in particular, CPU 51) further has a function called an EL display control means 50*g* that controls the displays on the transparent EL panels 28*a*, 28*b* and 28*c* via the EL drive circuit 63. Data (display data) such as graphics to be displayed on the transparent EL panels 28*a*, 28*b* and 28*c* are stored in the ROM 52 that functions as a display data memory means 50*h*. The EL display control means 50*g* displays the overlapping patterns 32, etc., on the transparent EL panels 28*a*, 28*b* and 28*c* using the display data which the CPU 51 as a display data selection means 50*j* read from the ROM 52. Because the stationary displays of the overlapping patterns 32 on the transparent EL panels 28*a*, 28*b* and 28*c* are primarily triggered by an input of the EL stop signal from the EL stop switch 45, the EL stop signal is inputted into the display data selection means 50*j*. The data that show the types and positions of the overlapping patterns 32 as stationary displays are provided to the arrangement determination means 50*j* by the display data selection means 50*j*.

Figure 6:
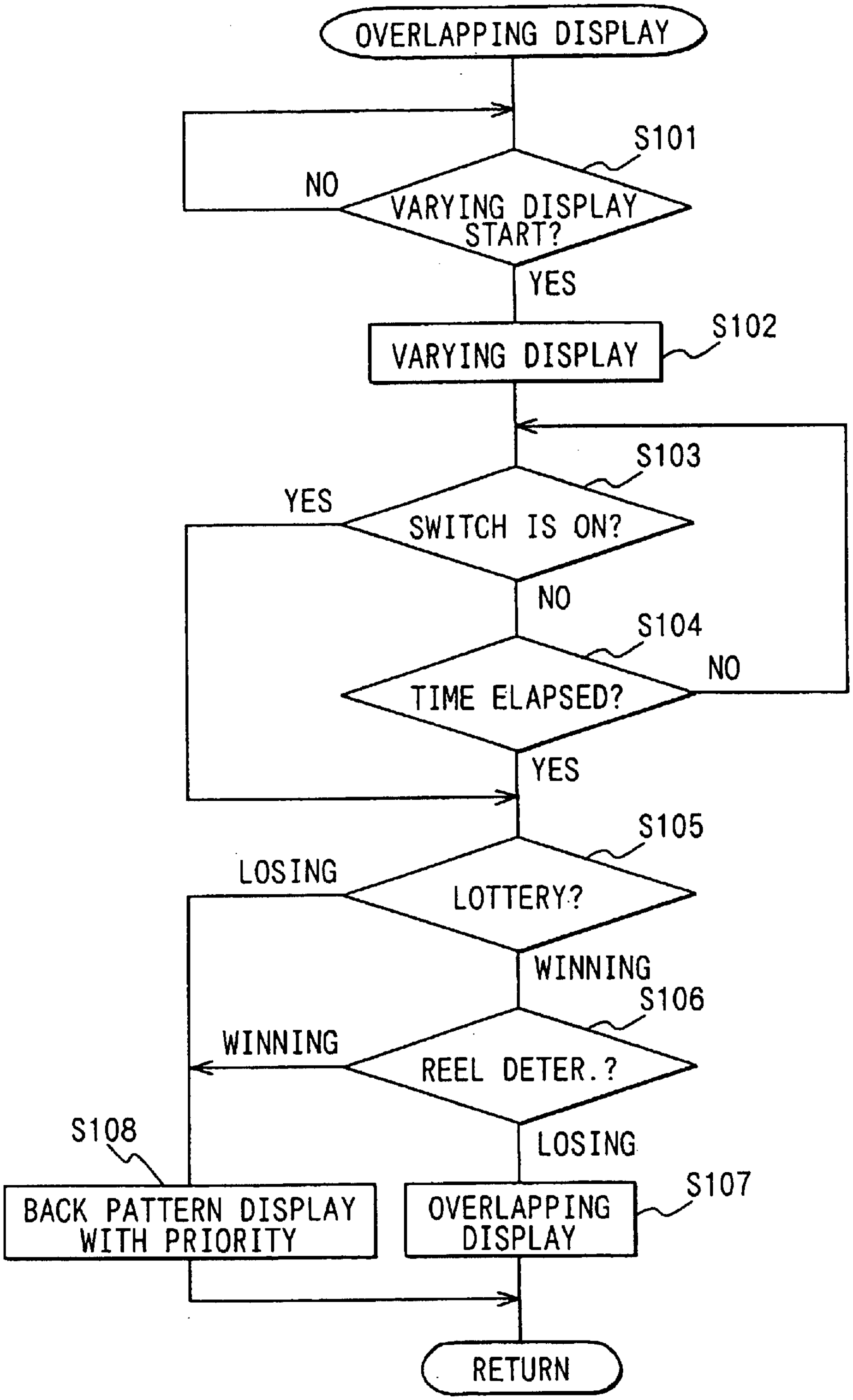
FIG. 6 is a flowchart showing a display control of the EL panels executed by a control unit of the slot machine shown in FIG. 1.

As shown in FIG. 6, the CPU 51 waits for the starting event of varying display of the overlapping patterns 32 (S101), and starts the varying display of the overlapping patterns 32 when it recognizes the starting event (S102). The varying display can be started with, for example, the input of the start signal from the start switch 42*a*. However, there is a possibility that the back patterns 31 may become difficult to be seen due to overlapping of the varying overlapping patterns 32 with the scrolling display of the reels 30*a*, 30*b* and 30*c*. In this connection, this embodiment is constructed in such a way that the varying display of the overlapping patterns 32 by the transparent EL panels 28*a*, 28*b* and 28*c* is started approximately synchronizing with the timing when all of the reels 30*a*, 30*b* and 30*c* stop.

Since each of the reels 30*a*, 30*b* and 30*c* stops independently, the overlapping patterns 32 of the transparent EL panels 28*a*, 28*b* and 28*c* may start performing the varying display respectively each time when the corresponding reel 30*a*, 30*b*, or 30*c* stops.

Next, the CPU 51 makes a determination whether any EL stop signal is inputted by the EL stop switch (S103) and, if no EL stop signal is received, makes another determination where a preset time (e.g., 10 seconds) has elapsed since the start of the varying display of the overlapping patterns 32 (S104). This step S104 is to be ready for a case where the player fails to operate the EL stop switch 45.

If the EL stop signal from the EL stop switch 45 is inputted (S103: YES) or the preset time has elapsed since the start of the varying display of the overlapping patterns 32 (S104: YES), the CPU 51 makes a determination (lottery) whether the combination of the back patterns 31 determined by the stop pattern selection means 50*d* is in a winning condition or not (S105). If the combination is determined to be in a losing condition, it displays a set of stationary overlapping patterns 32 on the transparent EL panels 28*a*, 28*b* and 28*c* that does not affect the losing stationary displays (i.e., maintains a losing status) of the back patterns 31 displayed by the already stopped reels 30*a*, 30*b* and 30*c* (S108).

On the other hand, if the combination of the back patterns 31 determined by the stop pattern selection means 50*d* is in a winning condition, a determination (reel determination) is made whether the winning combination is displayed by the already stopped reels 30*a*, 30*b* and 30*c* (whether the winning combination of the back patterns 31 determined by the stop pattern selection means 50*d* has materialized) (S106).

If the winning combination is not displayed by the back patterns 31 despite the fact that it is selected as a winning combination by the lottery, the CPU 51 makes the transparent EL panels 28*a*, 28*b* and 28*c* display the overlapping patterns 32 to display the winning combination in coordination with the back patterns 31 and the overlapping patterns 32 (S107).

An example of displaying a winning combination with the overlapping patterns 32 is described below referring to FIG. 3. In the example shown in FIG. 3, as the back patterns 31, the winning line L1 displays $, 7, 7, the winning line L2 displays $, $, X, the winning line L3 displays X, X, $, the winning line L4 displays $, 7, $ and the winning line L5 displays X, 7, X. Thus, no winning combinations are shown in any of these winning lines L1 to L5.

If an X pattern of the overlapping patterns 32 is displayed on the bottom place of the transparent EL panel 28*c*, the X pattern is displayed overlapping the $ pattern of the back pattern 31 on the right side of winning line L3 (as if the $ pattern is replaced with the X pattern), thereby producing three X's on the line, i.e., a winning combination of X, X, X.

Also, if an X pattern of the overlapping patterns 32 is displayed in the middle place of the transparent EL panel 28*b*, the X pattern is displayed overlapping the 7 pattern of the back pattern 31 in the middle of winning line L5 (as if the 7 pattern is replaced with the X pattern), thereby producing three X's on the line, i.e., a winning combination of X, X, X. Similarly, winning combinations can be displayed on other winning lines by controlling the overlapping patterns 32 (displayed patterns and positions).

In case where winning combinations are displayed by the combinations of the back patterns 31 and the overlapping patterns 32, it is not only possible to allow (effectuate) winning combinations unconditionally as described above, but is also possible to set up in such a way that a winning display is effectuated by a combination of the back patterns 31 and the overlapping patterns 32 only when a pair of identical patterns of the back patterns 31 and the overlapping patterns 32 exists (for example, when the 7 pattern of the back patterns 31 and the same 7 pattern of the overlapping pattern 32 are displayed in the middle of the transparent EL panel 28*c*). It is also possible to set up that a winning condition is established by a combination of the back patterns 31 and the overlapping patterns 32 only when a certain overlapping pattern 32 (e.g., 7) is displayed in the center (in the middle of the transparent El panel 28*b*).

Thus, in the present embodiment, the winning condition is established by the combination of the overlapping patterns 32 and the back patterns 31 only when the display content of the transparent EL panels 28*a*, 28*b* and 28*c* or the relation between the overlapping patterns 32 and the back patterns 31 meet a certain preset condition (front/back combination-permitting condition). Here, it should be noted that the front/back combination-permitting condition is not limited to a specific one, but may be preset arbitrary. For example, the front/back combination-permitting condition may be present to be satisfied when a state (reach-state) where only one pattern is required to get a winning condition by the back patterns or overlapping (front) patterns.

On the other hand, if a winning condition is determined by the lottery and the corresponding winning combination is displayed by the back patterns 31 (S106: win), the CPU 51 makes the transparent EL panels 28*a*, 28*b* and 28*c* perform a stationary display of a set of overlapping patterns 32 that does not affect the stationary display of the back patterns 31 provided by already stopped reels 30*a*, 30*b* and 30*c* (S108).

However, if the display of the overlapping patterns 32 is not anything meaningful when the winning combination is displayed by the back patterns 31 of the reels 30*a*, 30*b* and 30*c*, the player may not have any interest on the display contents of the transparent EL panels 28*a*, 28*b* and 28*c* (i.e., the display of the overlapping patterns becomes meaningless). In such a case (when the winning is displayed by the back patterns 31), therefore, it is preferable to give additional advantages to the player depending on the display of the overlapping patterns 32.

Specifically, a winning condition may be allowed additionally by the combination of the overlapping patterns 32 and the back patterns 31, or the number of coins to be dispensed may be increased, for example, twice when the back patterns 31 display a winning combination and a certain overlapping pattern 32 (e.g., $) is displayed on one of them. Otherwise, a winning condition may be established by the combination of the overlapping patterns 32 and the back patterns 31 only when the overlapping pattern 32 on the middle row of the EL panel 28*b* (the center of the matrix) has a specific pattern such as "7". The combination of the overlapping patterns 32 and the back patterns 31 may be determined as a winning condition only when both the overlapping pattern 32 and the back pattern 31 overlapping each other are, for example, "7". Otherwise, a specific number (for example, 100) of coins may be dispensed when the overlapping pattern 32 coincides with the back pattern 31 without setting the winning line. These permitting conditions will make it possible to attract the player's attention until the stationary display of the overlapping pattern 32 is completed. That is, even when the back patterns do not satisfy any winning conditions, the player can expect the result of the overlapping patterns.

Figure 7:
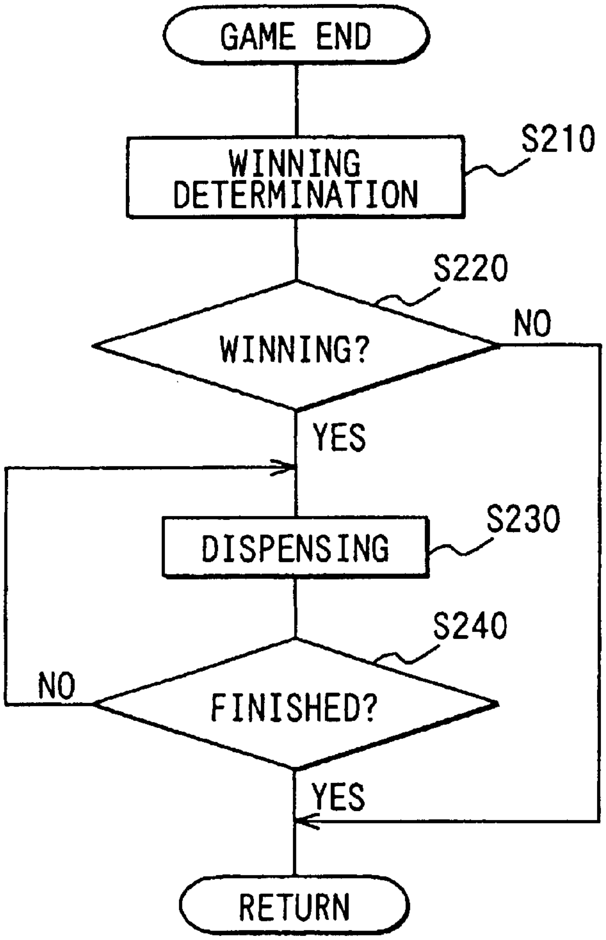
FIG. 7 is a flowchart showing a game end control executed by the control unit.
Figure 8:
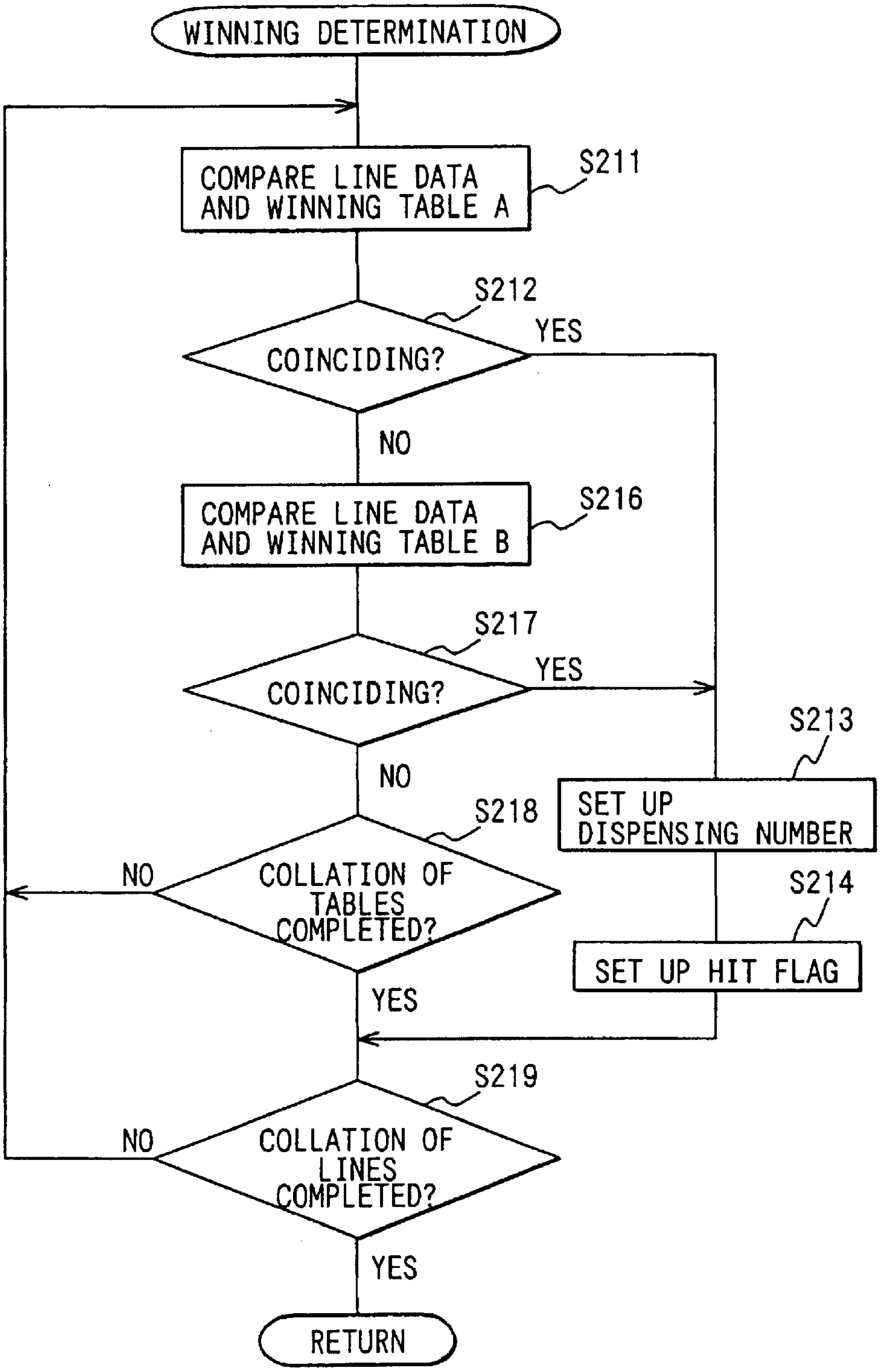
FIG. 8 is a flowchart showing a winning determination process executed by the control unit.

Then, the game is over when the displays of the overlapping patterns 32 by the transparent EL panels 28*a*, 28*b* and 28*c* are completed, and the CPU 51 executes a game end process as shown in FIG. 7. The first step of the process is to make determination of a winning condition (winning) (S210). Its detail is shown in FIG. 8. The CPU 51 retrieves winning table A (stored in the ROM 52) that compares the winning arrangement of the back patterns 31 and the contents of the winning. The CPU 51 then checks, for example, if there is anything that coincides with the arrangement of the stationary display of the back patterns 31 along the winning line L1 (S211). If there is a coinciding arrangement (S212: YES), it sets up (writes into the RAM 53) the number of coins to be dispensed (dispensing number) based on the contents of the winning corresponding to the arrangement (S213), and sets up hit flag (e.g., the flag that indicates the start of the Bonus Game or the Big Bonus Game) corresponding to the particular winning arrangement (S214).

If there is no coinciding arrangement (S212: NO), The CPU 51 retrieves winning table B (stored in the ROM 52)

that compares the winning arrangement according to the combination of the back patterns 31 and the overlapping patterns 32 and the contents of the winning. The CPU 51 then checks, for example, if there is anything that coincides with the combination of the back patterns 31 and the overlapping patterns 32 which are displayed stationary along the winning line that is the object of the check at S211 (the winning line L1 in this case) (S216). If there is a coinciding arrangement (S217: YES), the dispensing number will be set up similarly as above (S213), and sets up the corresponding hit flag (S214).

If no coinciding arrangement can still be found here (S217: NO), it checks if all the collation has been completed concerning the object winning line (the winning line L1 in this case) for the entire arrangements of the Tables A and B (S218), and returns to the S211 if it is not completed.

If the answer is positive at step S218, or after step S214, it is determined whether the above collation has been completed for the entire winning lines L1 to L5 (S219), and it returns to S211 if it is not completed, or returns to the game end process if it is completed.

Referring back to FIG. 7, following the winning determination (S210) in the game end process, it is determined whether the particular winning is established (more precisely whether the dispensing number is set up) (S220). If the dispensing number is set up (S230), the dispenser 65 is activated to dispense coins from the coin hopper 66 to the receiving tray 16. When the number of coins that corresponds to the dispensing number setup is dispensed (S240: YES), it returns to the main routine. After returning to the main routine, processes for starting the next game such as clearing of the data of this game will be performed.

Figure 9:
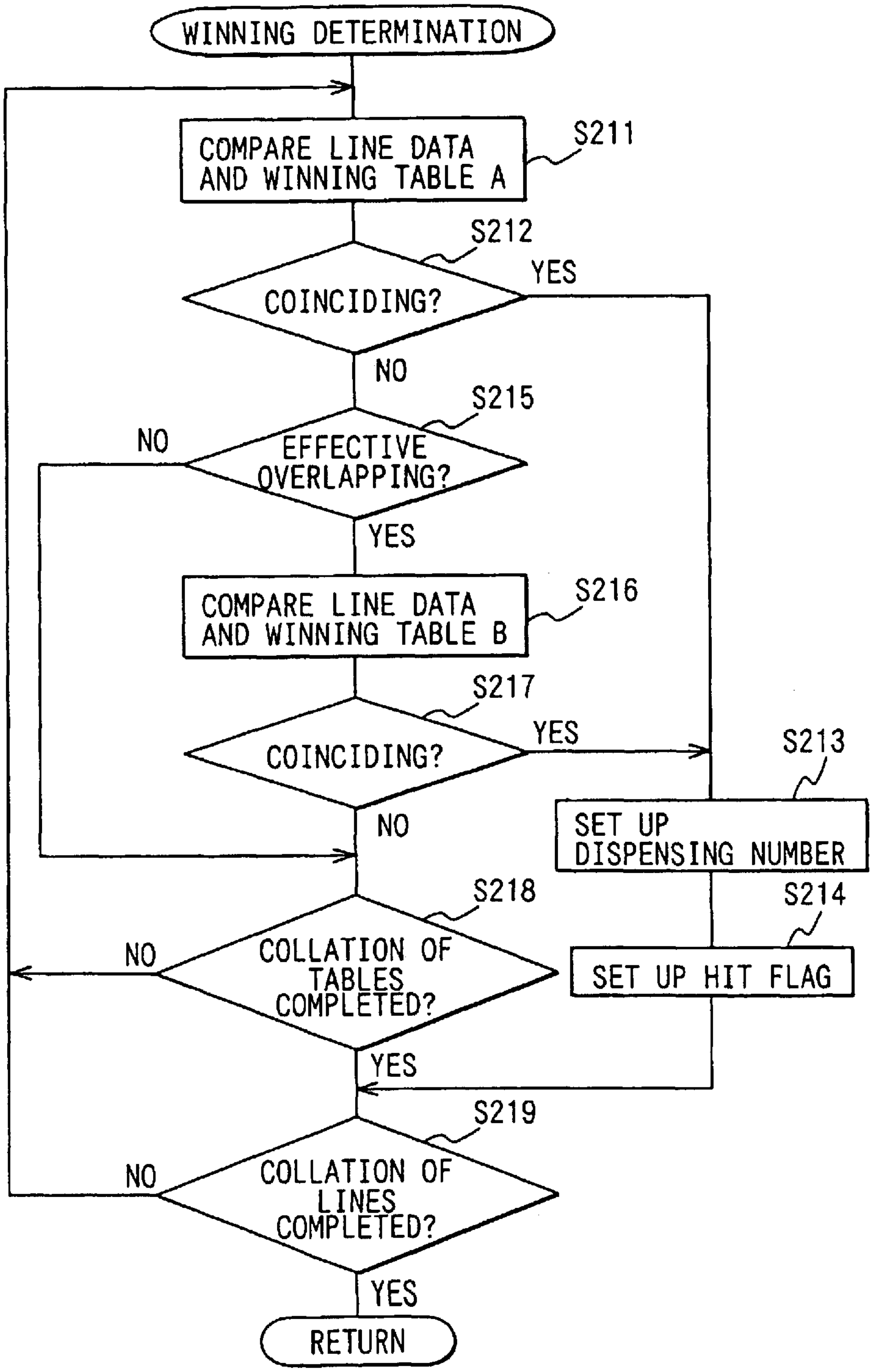
FIG. 9 is a flowchart showing a modified example of the winning determination process.

If it is set up that a winning based on the combination of the back patterns 31 and the overlapping patterns 32 is considered valid only when the front/back combination-permitting condition is satisfied, as shown in FIG. 9, a step for determining whether the combination with the overlapping patterns 32 should be considered valid (i.e., whether the front/back combination-permitting condition is satisfied) (S215) may be inserted between step S212 and step S216. In this case, step S216 is executed when the front/back combination-permitting condition is satisfied (S215: YES).

Such is the description of the control process executed by the control unit 50 (particularly CPU 51). As to control processes that are not described here or the operation of the slot machine 10, they are similar to those found on conventional pachi-suro machines so that their descriptions are omitted.

As can be seen from the above, the embodiment provides richer variations of pattern displays and increases the player's interest because it allows the combination of the back patterns 31 of the reels 30*a*, 30*b* and 30*c* and the overlapping patterns 32 of the transparent EL panels 28*a*, 28*b* and 28*c* to be made valid and dispenses the coins when the winning is achieved based on the combination of the back patterns 31 and the overlapping patterns 32. In particular, since the overlapping patterns 32 of the transparent EL panels 28*a*, 28*b* and 28*c* can bring a winning to the player, the player's interest in this display can be heightened and the value of the transparent EL panels 28*a*, 28*b* and 28*c* can be increased.

Moreover, if the combination of the back patterns 31 and the overlapping patterns 32 is considered effective only when the front/back combination-permitting condition is satisfied as shown in FIG. 9, the relativity between the back patterns 31 and the overlapping patterns 32 becomes more important and the player's interest can be further heightened.

Although it is shown and described in the above embodiment that the player recognizes winning or losing (the display of the game target for each game), it can also be constructed to let the player recognize, as the display of the game target, a state of game (experiencing a variety of games) such as switching from a game A to a game B based on the combination of the back patterns 31 and the overlapping patterns 32. This can add more depth to the game by providing a game selection capability to the player.

Furthermore, the player may select a game mode from a mode using a combination of the overlapping patterns 32 and the back patterns 31, a mode using only the back patterns 31, and a mode using only the overlapping patterns 32 of the EL displays, in accordance with, for example, a number of deposited coins. When the mode using only the back patterns 31 is selected, the back patterns 31 can be seen through the EL panels 281, 28*b*, and 28*c* because they are transparent.

When the mode using only the overlapping patters 32 is selected, the player recognizes an independent display of the EL panels 28*a* to 28*c* that display the overlapping pattern 32, as a game target display. In this case, for example, it is possible to let the player recognize a game value or special award through special displays of the overlapping patterns 32 while maintaining the back patterns 31 unchanged. The player can therefore try to operate the game machine to let it make such special displays of the overlapping patterns 32, which can also increase the player's interest.

Furthermore, although the display of winning or loss may be indicated to the player by the illumination of the line markers M1 to M5, the same objective can be achieved by voice message.

Moreover, instead of having the display means such as the line marker, it is possible to make the player see the game target display to indicate winning or loss through the mode of the overlapping pattern 32 itself, its display color itself, or the display itself of the overlapping pattern 32 in the combination display with the back patterns 31. Such a display mode is suitable for a game machine. In the case of game machines, they are often equipped with operator's manuals. Therefore, if the operator's manual has an explanation such that a variety of games (such as the switching from the game A to the game B as mentioned above) can be achieved through the shapes and display colors of the overlapping patterns 32, the player can recognize the type of the game by directly seeing and making determination on the shapes and colors of the overlapping pattern 32.

Second Embodiment

Figure 11:
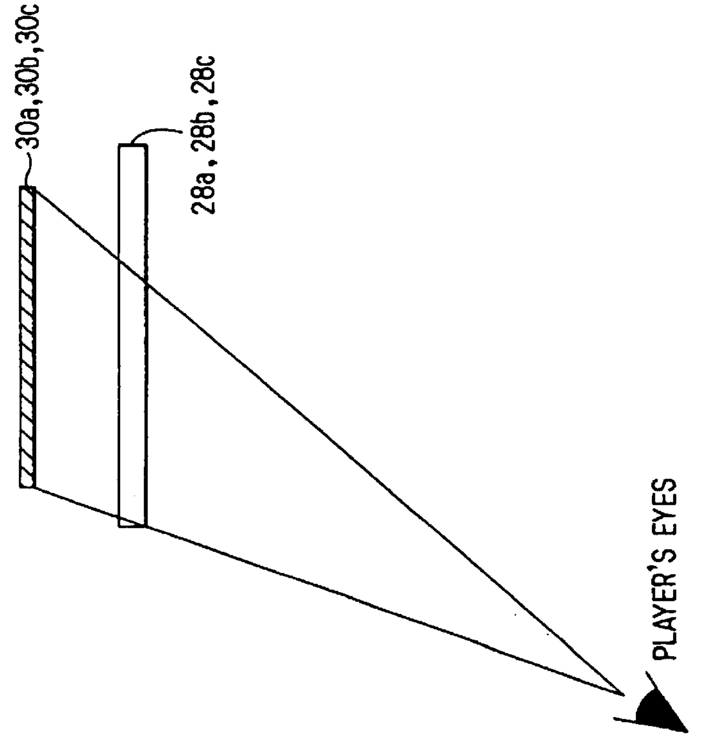

As described above, in the slot machine 10 of the first embodiment, the display regions of the transparent EL panels 28*a*, 28*b*, and 28*c* are larger than the areas of the reels 30*a*, 30*b* and 30*c* that can be viewed by the player. Therefore, as schematically shown in FIG. 11, the player can view securely the display areas of the reels 30*a*, 30*b* and 30*c* through the transparent EL panels 28*a*, 28*b*, and 28*c* even if the player's viewpoint (posture) slightly changes. The distances between the transparent EL panels 28*a*, 28*b*, and 28*c* and the reels 30*a*, 30*b* and 30*c* are chosen in such a way that the pattern of an adjacent reel (e.g., reel 30*a*) cannot be seen through a certain transparent EL panel (e.g., transparent EL panel 28*b*). In consequence, the overlapping display does not cause any confusion.

Figure 12:
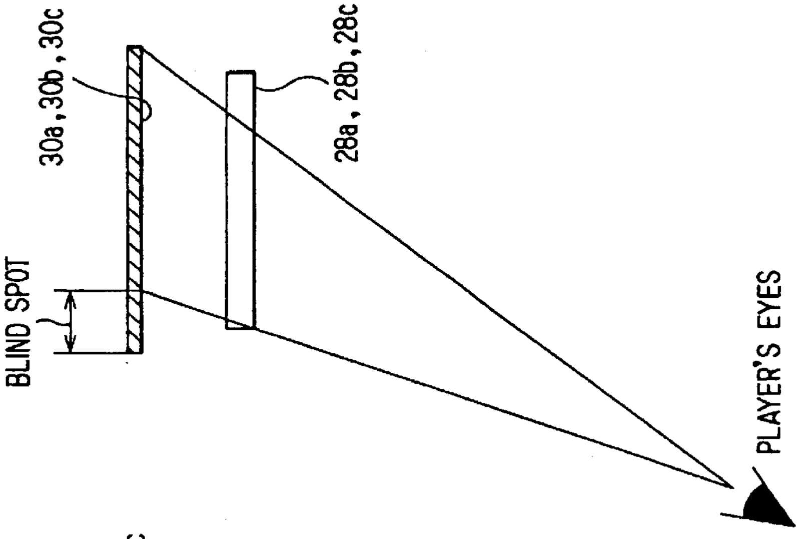
FIGS. 11 and 12 are explanatory views for explaining a case where a blind spot is produced on reels in a second embodiment.

This advantageous of the invention is studied and explained in more detail as a second embodiment below to improve visibility of the overlapping display and to prevent a blind spot region from generating on the back patterns 31 as shown in FIG. 12. FIG. 12 shows the case where the back patterns 31 displayed on the reels 30*a*, 30*b*, and 30*c* cannot completely be recognized by the player through the transparent display panels 28*a*, 28*b*, and 28*b*, and the blind spot region is produced on the back patterns 31 when the viewpoint (posture) of the player changes.

Because the basic structure and operation of the slot machine 10 in the second embodiment are the same as those in the first embodiment, the same parts and portions are designated with the same reference numerals and the same explanations will not be reiterated.

Figure 13:
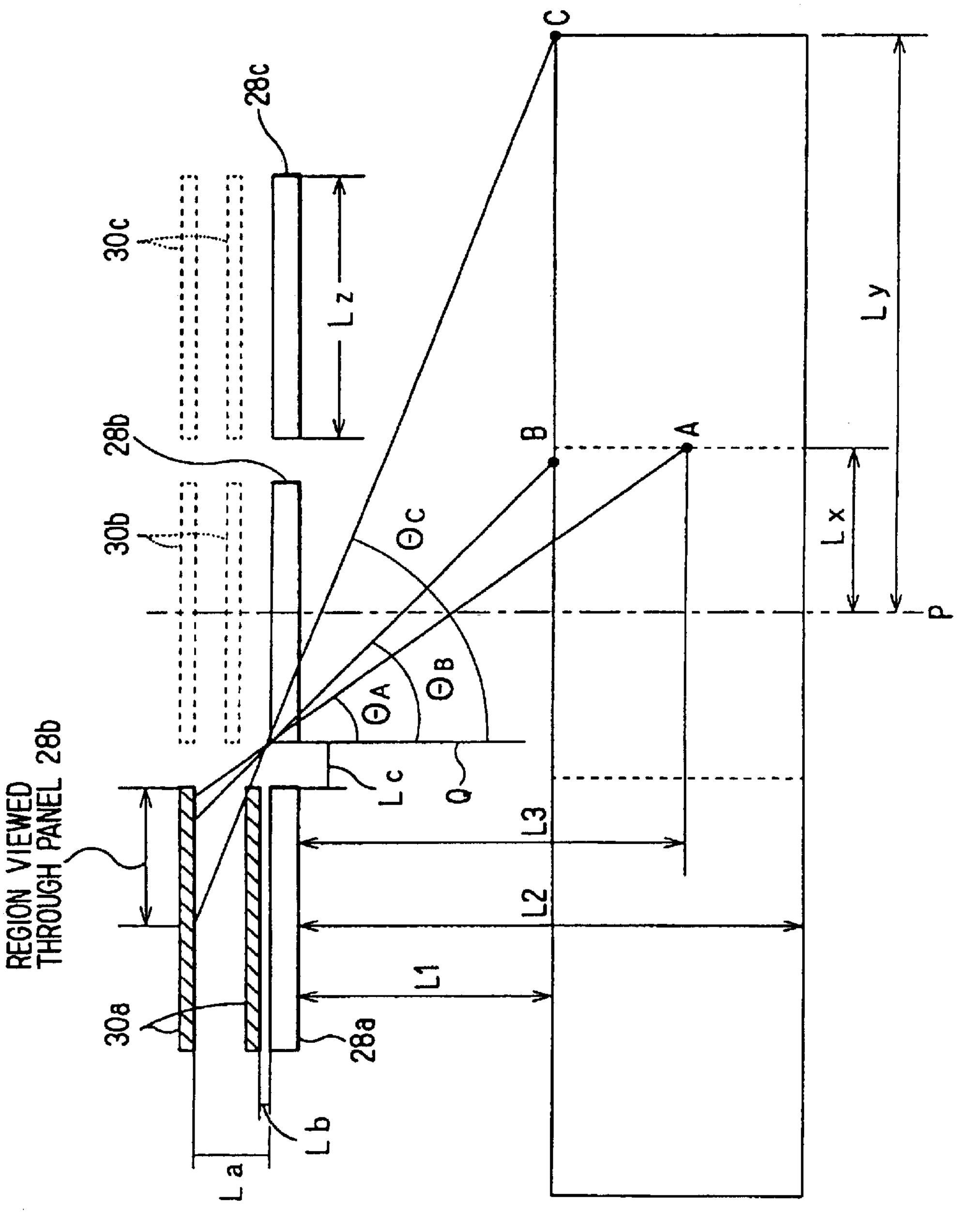
FIG. 13 is a schematic view for explaining dimensions set between the EL panels and the reels in the second embodiment.

Then, an arrangement example for preventing the back pattern on an adjacent one of the reels 30*a*, 30*b*, and 30*c* from being viewed through a certain one of the transparent EL panels 28*a*, 28*b*, and 28*c* is explained with reference to FIG. 13. In this example, the interval of the transparent EL panels 28*a*, 28*b*, and 28*c* (width of an oblique portion) and each distance between the EL panels 28*a*, 28*b*, and 28*c* and the reels 30*a*, 30*b*, and 30*c* opposing each other are appropriately set.

Specifically, it is assumed that a maximum motion width (maximum lateral motion width Ly) of a player's posture (viewpoint) in a lateral direction from the center (axial line P of the central EL panel 28*b*) is 30 cm and an ordinary motion width (ordinary lateral motion width Lx) thereof in the lateral direction is 10 cm. The distance from the EL panels 28*a*, 28*b*, and 28*c* is assumed to be in a range of 30 cm (close distance L1) to 60 cm (remote distance L2). In the front and back direction, it becomes difficult to see the entirety of the back patterns 31 and the overlapping patters if the distance is too small (the player approaches too closely), while it becomes difficult to operate the stop switches 44*a*, 44*b*, and 44*c* if the distance is too large.

Viewpoints from point C (Ly=30 cm, L1=30 cm) and its line-symmetrical point are the most difficult case to see the entirety. Here, each width Lz of the EL panels 28*a*, 28*b*, and 28*c* is set to be 8 cm because respective opposing reel 30*a*, 30*b*, or 30*c* has a display surface generally having a width of 6 to 8 cm (when used for a Pachi-suro machine). In this case, the eyes from the point C make angle $\Theta_c$ of about 48.6 degrees with an extending line Q from the edge surface of the EL panel 28*b* at the side of the EL panel 28*a*. The interval Lc between adjacent two of the EL panels 28*a*, 28*b*, and 28*c* is set at 1.5 cm in consideration of easiness of the player seeing them.

Under theses conditions, the distance Lb between the EL panel 28*a* and the display surface of the reel 30*a* needs to be equal to or less than 1.3 cm (which is similarly applied to that between the EL panel 28*c* and the reel 30*c*) to completely prevent the display surface of the reel 30*a* from being viewed by the player's eyes from the point C through the EL panel 28*b*.

Incidentally, a state at least capable of preventing the display surface of the reel 30*a* from being viewed from the point A is acceptable so long as it is used in an ordinary way. This state is attained by, for example, the distance L3 from the EL panels 28*a*, 28*b*, and 28*c* being 45 cm and the ordinary lateral motion width Lx being 10 cm. Even in this case, the distance Lb between the El panel 28*a* and the display surface of the reel 30*a* must be equal to or less than 4.8 cm when Lz=8 cm and Lc=1.5 cm (which is similarly applied to that between the EL panel 28*c* and the reel 30*c*).

Thus, in this embodiment, the distances Lb between the EL panels 28*a*, 28*b* and 28*c* and the reels 30*a*, 30*b*, and 30*c* are determined in consideration of the widths of the EL panels 28*a*, 28*b*, and 28*c*, the widths of the reels 30*a*, 30*b*, and 30*c* as well as the interval between the EL panels 28*a*, 28*b*, and 28*c* while assuming the range of the player's posture variation. In consequence, the player cannot see, through a certain transparent EL panel 28*a*, 28*b*, or 28*c*, the pattern on an adjacent reel 30*a*, 30*b*, or 30*c*, and overlapping display does not cause any confusion. The arrangement conditions are not limited to those described above, but may be changed appropriately. Further, the same advantages can be obtained by setting other factors (dimensions, distances, shapes, etc.) other than those described above.

Figure 14:
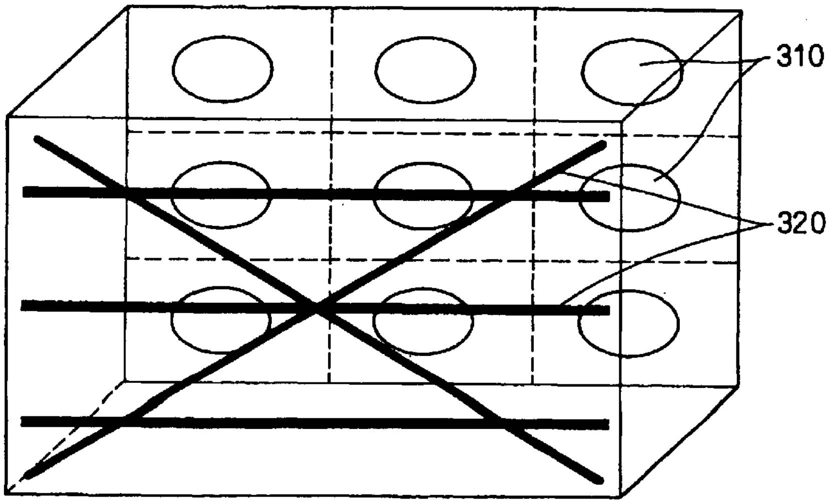
FIG. 14 is a perspective schematic view for explaining another example of overlapping display.

This embodiment can be applied to a machine having reels that performs scroll-display of back patterns 310, and a transparent display panel that displays (activate) winning lines 320 overlapping with the back patterns 310 as shown in FIG. 14. By adopting this embodiment appropriately, for example, a diagonally extending line 320 can be recognized on the diagonally arranged three back patterns 310 precisely even when the player's viewpoint slightly changes.

Figure 15:
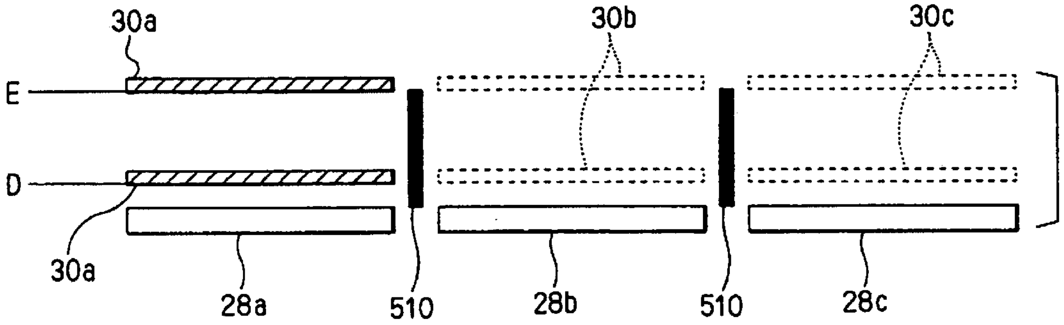
FIG. 15 is an explanatory view showing another example adopting partition walls to prevent patterns on an adjacent reel from being seen through a certain EL panel in the second embodiment.

As a modification of this embodiment, as shown in FIG. 15, partition walls 510 may be provided to prevent the pattern on a certain reel 30*a*, 30*b*, or 30*c* from being viewed through an adjacent EL panel 28*a*, 28*b*, or 28*c*. Specifically, the partition walls 510 are disposed in spaces between the EL panels 28*a* and 28*b* and between the El panels 28*b* and 28*c*, so that the patterns of the reels 30*a*, 30*c* are not viewed through the EL panel 28*b*. The partition walls 510 also prevent the pattern of the reel 30*b* from being viewed through the EL panel 28*c* or 28*a*. Thus, the pattern of a certain reel 30*a*, 30*b*, and 30*c* is not viewed through an adjacent EL panel 28*a*, 28*b*, or 28*c*, and the overlapping display does not cause any confusion.

A depth dimension of each partition wall 510 can be determined in accordance with the distances between the El panels 28*a*, 28*b*, and 28*c* and the reels 30*a*, 30*b*, and 30*c*. The depth dimension of the partition wall 510 set a little larger can exhibit the above advantageous in both cases where the reels 30*a*, 30*b*, and 30*c* are positioned at an close distance (position D) from the EL panels 28*a*, 28*b*, and 28*c*, and at a remote distance (position E) from them.

Figure 16:
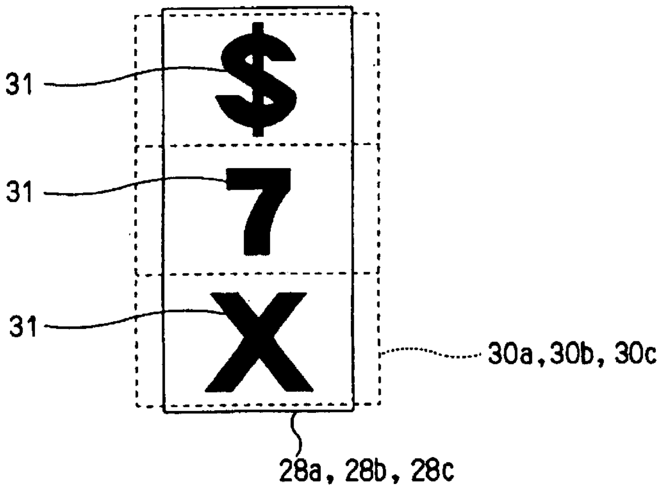
FIG. 16 is an explanatory view showing another example setting dimensions of back patterns on the reels to prevent patterns on an adjacent reel from being seen through a certain EL panel in the second embodiment.

Next, another modification is explained wit reference to FIG. 16, which controls each width of the EL panels 28*a*, 28*b*, and 28*c* and each width of the back patterns 31 so that the back patterns 31 of the reels 30*a*, 30*b*, and 30*c* are not seen through the respective adjacent EL panels 28*a*, 28*b*, and 28*c*.

Specifically, the width of the EL panels 28*a*, 28*b*, and 28*c* is smaller than that of the reels 30*a*, 30*b*, and 30*c*; however, the back patterns 31 are not drawn at an entire region of the reels in the width direction. The widths of the back patterns 31 are sufficiently smaller than the width of the EL panels 28*a*, 28*b*, and 28*c* (for example, about a half of the width of the panels). Because of this, even when the player's viewpoint changes in the lateral direction largely, the player can see the patterns 31 of the reels 30*a*, 30*b*, and 30*c* in its entirety through the EL panels 28*a*, 28*b*, and 28*c* (without a blind spot region) without producing blind points. The player can then securely recognize the stationary displayed patterns 31 that indicate losing or winning information to the player. Thus, any confusion is not caused by incomplete views of the back patterns 31.

Third Embodiment

A third embodiment is also to improve visibility of the overlapping display of the back patterns and the overlapping patterns.

Figure 17:
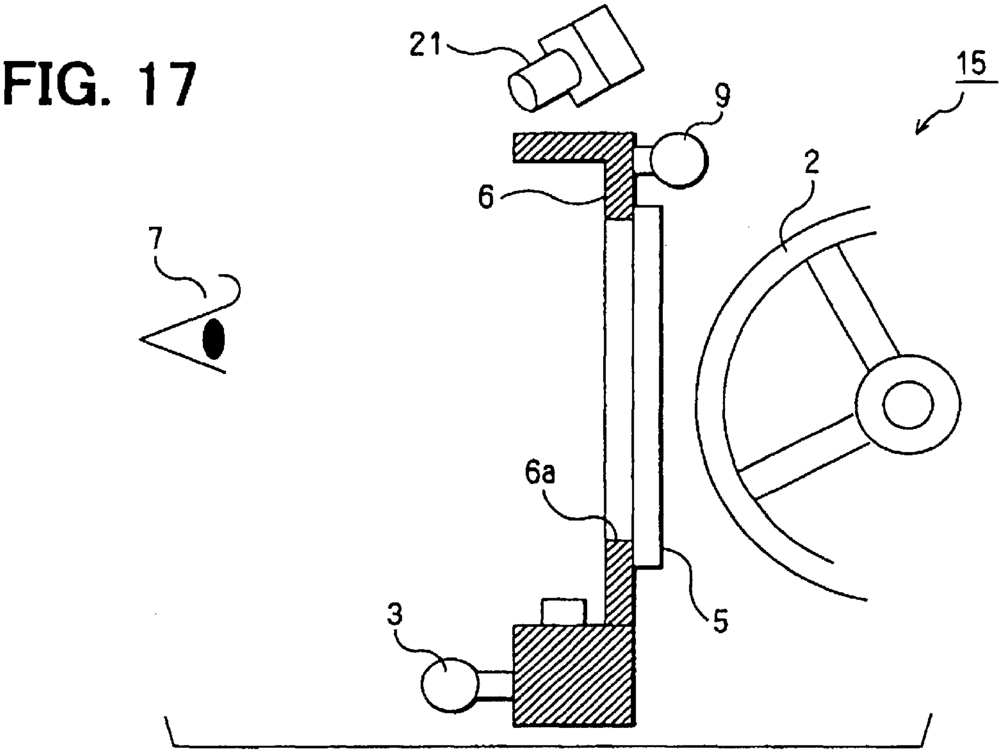
FIG. 17 is a cross-sectional view schematically showing a main part of a slot machine in a third embodiment.
Figure 18:
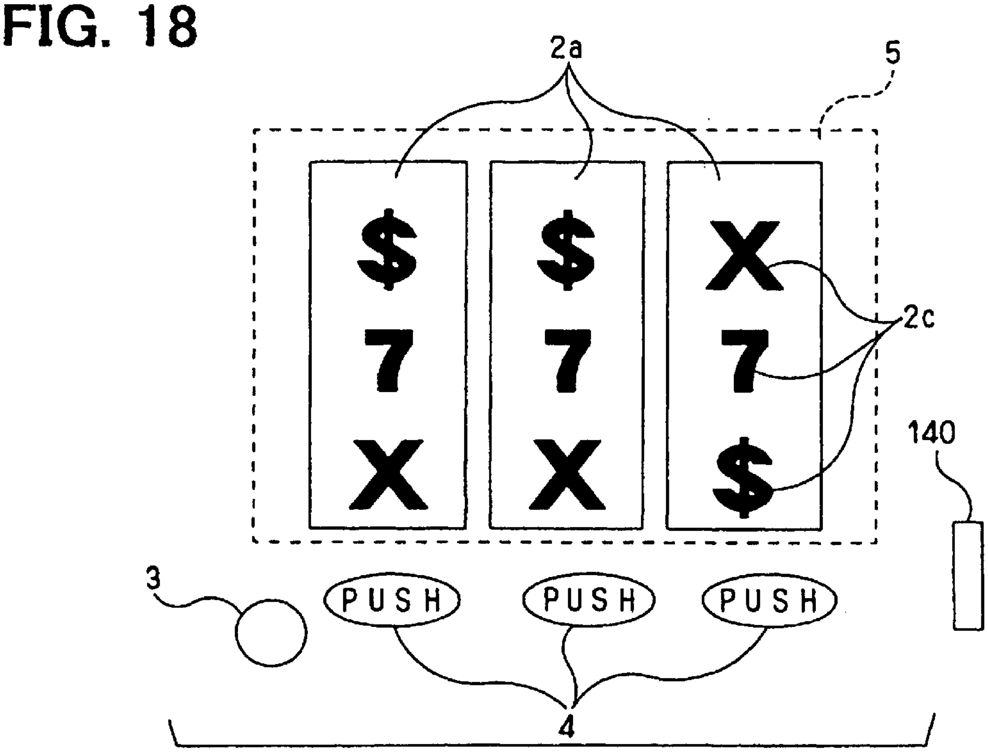
FIG. 18 is a plan view schematically showing a display part of the slot machine in the third embodiment.

First, a slot machine 15 in the third embodiment is explained with reference to FIGS. 17 to 20. The slot machine 15 has a front frame 11 to which a panel 6 is attached. The panel 6 has a display window 6*a* at a position facing a player 7 in a state where the machine 15 is installed. A transparent EL panel, 5 is attached to the back surface of the panel 6, which corresponds to a front side display means (display unit). A rotational reel display device 2 is disposed at the back side of the transparent EL panel 5 (inside of a box 100 shown in FIG. 19). The rotational reel display device 2 is composed of three reels 2*a*, and motors 2*b* (FIG. 21) for driving the reels 2*a*. Patterns 2*c* ($, 7, X, etc.) exemplified in FIG. 18 are drawn on the respective reels 2*a*, and respective three patterns 2*c* can be seen through the display window 6*a*. That is, a 3×3 matrix is displayed by the reels 2*a*.

A fluorescent lamp 9 is disposed inside the front frame 11 at an obliquely upper position of the EL panel 5, and illuminates the reels 2*a*. Further, a sort of switches such as a start lever 3 and stop switches 4 that are operable by the player to play slot games, a coin insertion port 140, and the like are provided on the front frame 11. As shown in FIG. 18, the stop switches 4 are provided one by one at positions corresponding to the respective reels 2*a*. As shown in FIG. 17, a CCD camera 21 is further installed at an upper portion of the slot machine 15 in such a way that it can take photographs of approximately the upper part of the player using the slot machine 15.

Figure 19:
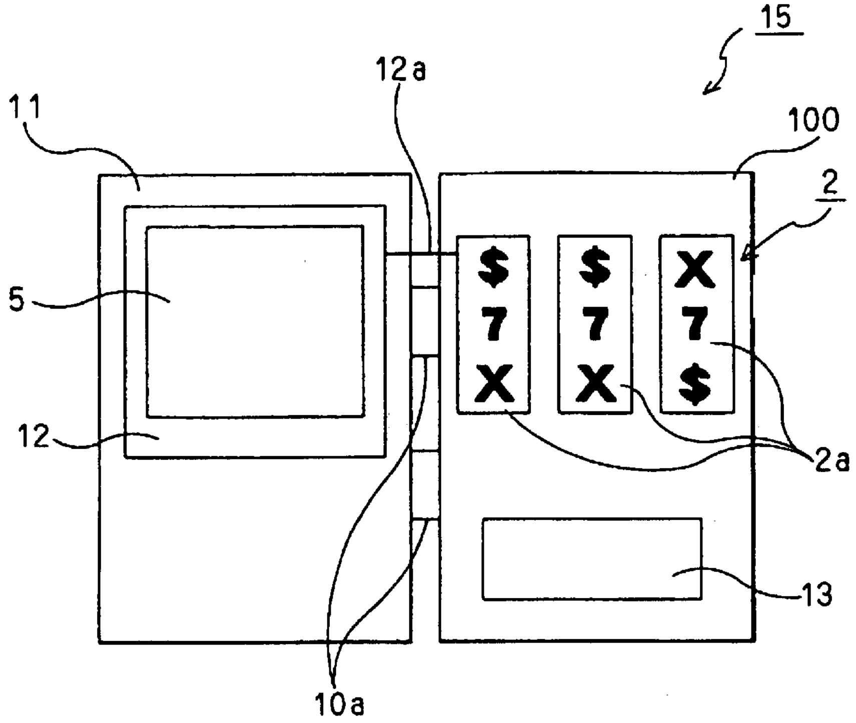
FIG. 19 is a front view schematically showing the slot machine in a state where a front frame is opened.

Referring to FIG. 19, the front frame 11 is rotatably supported by the box 100 via hinges 10*a*. The EL panel 5 is integrally formed with a drive circuit 12, and is connected to a main substrate 13, which is accommodated in the box 100, through a harness 12*a*.

Because the EL panel 5 is attached to the front frame 11, it can be exposed entirely by opening the front frame 11. Therefore, the inspection and repair of the EL panel 5 can be performed easily, and thus the maintenance performance is good. Further, because the drive circuit 12 is integrated with the EL panel 5, it is not necessary to connect the drive circuit 12 and the EL panel 5 via a harness and the like. Assemblies concerning the display of the EL panel 5 are integrated on the side of the front frame 11. The number of the harness 12*a* connecting the box 100 and the front frame 11 therebetween can be therefore minimized, so that the harness 12*a* hardly adversely affects the opening/closing of the front frame 11 in this embodiment.

Figure 21:
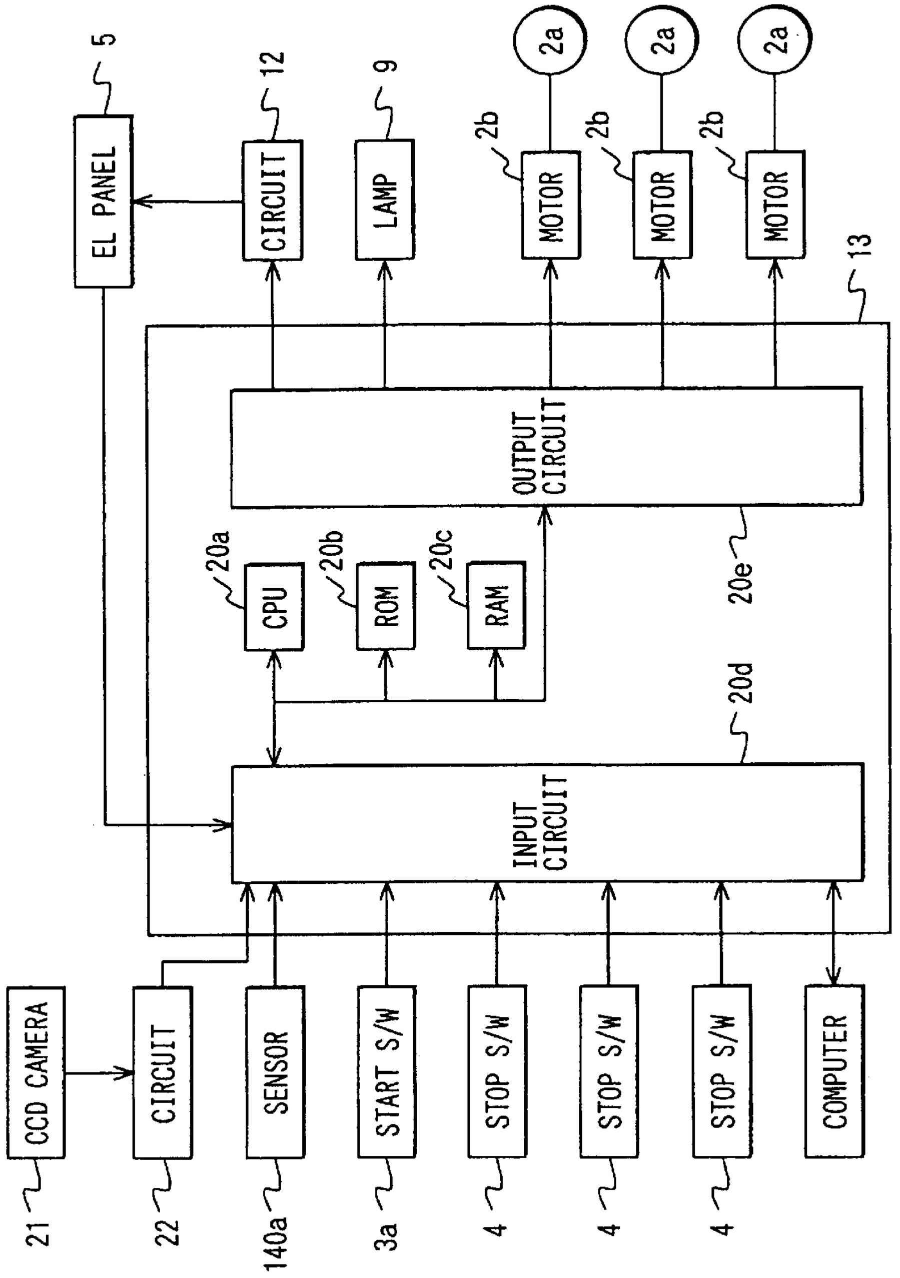
FIG. 21 is a block diagram for explaining a control system of the slot machine in the third embodiment.

The main part of the control system of the slot machine 15 is as shown in FIG. 21, and a CPU 20*a*, a ROM 20*b*, a RAM 20*c*, an input circuit 20*d*, and an output circuit 20*e* are mounted on the main substrate 13. The input circuit 20*d* are connected to a coin deposit sensor 140*a* that detects coins deposited (inserted) through the coin insertion port 140, a start switch 3*a* that interconnects with the start lever 3, the stop switches 4, and a hall computer. The main substrate 13 can receive a deposit signal from the coin deposit sensor 140*a*, a start signal from the start switch 3*a*, and stop signals from the stop switches 4, and can communicate with the hall computer. The hall computer provides information such as business configuration peculiar to a playground in which the slot machine 15 is installed, and such information is used as a display of the EL panel 5 (detailed explanation is below) at a waiting state.

The surface of the EL panel 5 at the side of the player forms a touch panel, and information indicating a position touched by the player's finger is inputted into the main substrate 13. The output of the CCD camera 21 is inputted into an image processing circuit 22, and the output of the image processing circuit 22 is inputted into the input circuit 20*d*. The image processing circuit 22 executes image processing to the image date obtained by the CCD camera 21, and outputs date indicating whether a person (player) exists in front of the slot machine 15. Thus, the CCD camera 21 and the image processing circuit 22 constitute an existence detecting means.

On the other hand, the drive circuit 12, the fluorescent lamp 9, the motors 2*b*, and the like are connected to the output circuit 20*e*. The main substrate 13 can control display contents of the EL panel 5 through the drive circuit 12, turning on and off of the fluorescent lamp 9, and the operations of the motors 2*b*.

Figure 20:
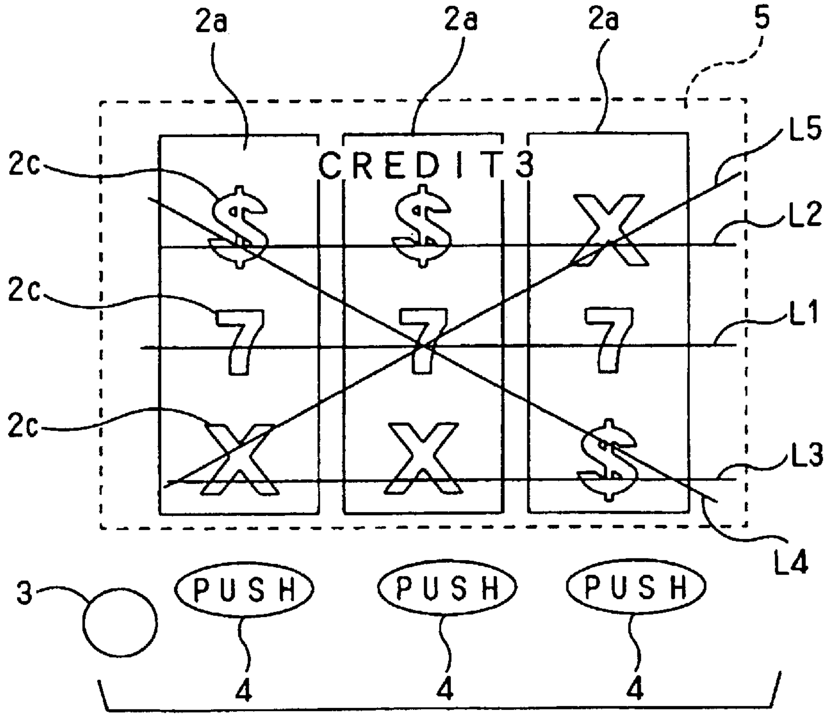
FIG. 20 is an explanatory view showing display of a transparent EL display when a game is played in the slot machine.

Next, the operations of this slot machine 15 are explained. The slot machine 15 has a playing mode (playing state) when a game is executed, and a waiting mode (waiting state) when no game is executed. The operation of the slot machine 15 in the playing state is changed based on the structure of the EL panel 5. That is, the El panel 5 may be composed of several panel regions capable of displaying several overlapping patterns that can be used in combination with the back patterns of the reels 2*a* to determine game conditions as in the first embodiment, or may display effective winning lines L1 to L5 as shown in FIGS. 14 and 20. When the EL panel 5 can display several overlapping patterns corresponding to the back patterns, the operation of the slot machine 15 in the playing state is substantially the same as that in the first embodiment. Here, only operations concerning the waiting state are explained specifically below, which are the features of the present embodiment.

Figure 22:
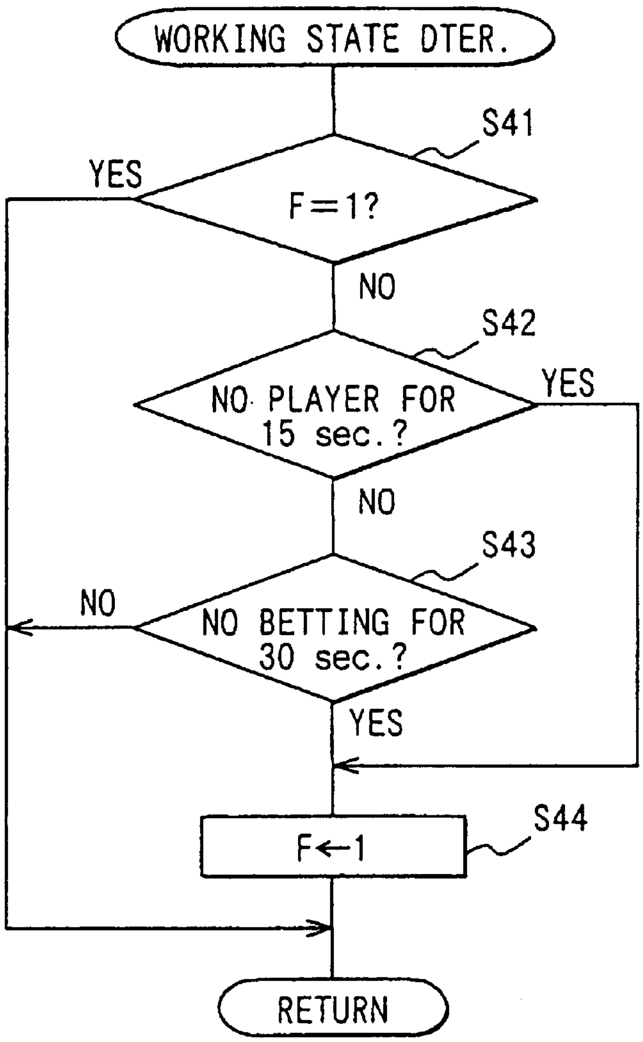
FIG. 22 is a flowchart showing a working state determination process executed by a CPU of the slot machine in the third embodiment.

FIG. 22 shows a flowchart of a working state determination process that the CPU 20*a* repeats appropriate timing (for example, determined by a timer). In this working state determination process, the CPU 20*a* first determines whether waiting state flag F satisfies F=1 (S41). The waiting state flag F represents whether the slot machine 15 is in the waiting state without being used for games. When the flag F is set at "1", it represents the waiting state, and this process ends.

If the flag F is not "1" (that is, if the machine 15 is not in the waiting state), it is determined whether a state where a player does not exist continuously for 15 seconds or more continues based on the data from the image processing circuit 22 (S42). If the determination is positive (if no player exists), the waiting state flag F is set at "1" (S44) and this process ends. Even if the determination at S42 is negative (if a player exists), when the game is not played actuary, it should be considered and determined as the waiting state. In this embodiment, the mode is moved to the waiting state in a state where betting (the operation of the bet switch at the time of coin deposition or credit) has not been performed for 30 seconds or more. Therefore, here, it is determined whether the betting has not been performed for 30 seconds or more (S43). If the determination is positive (there is no bedding), the waiting state flag F is set at "1" (S44), and this process ends.

The time periods (15 seconds at S42, 30 seconds at S43) are merely examples, and may be changed in accordance with conditions such as a kind of the game machine and business configuration. When the game machine is started at the playground opening time, either of the waiting state and the playing state can be arbitrarily set.

Next, the operation of the slot machine 15 in the waiting state is explained focusing on the display of the transparent EL panel 5.

Figure 23:
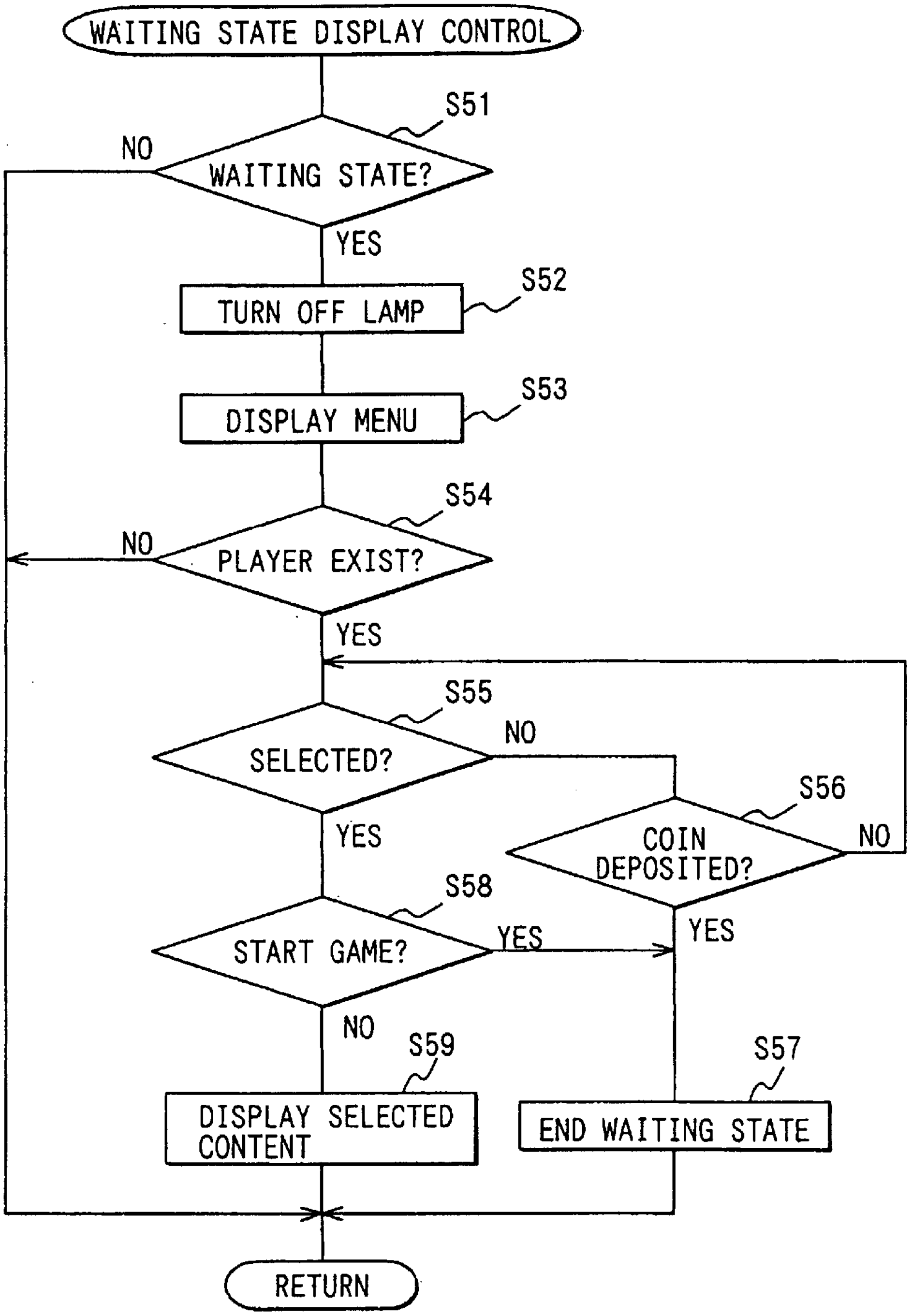
FIG. 23 is a flowchart showing a waiting state display control executed by the CPU in the third embodiment.

FIG. 23 shows a waiting state display control process that the CPU 20*a* repeats at appropriate timing (for example, determined by a timer). In this process, first, the CPU 20*a* determines whether the slot machine 15 is in the waiting state by the determination whether the waiting sate flag F is 1 or not (S51). If it is not in the waiting state, this process ends here.

Figure 24:
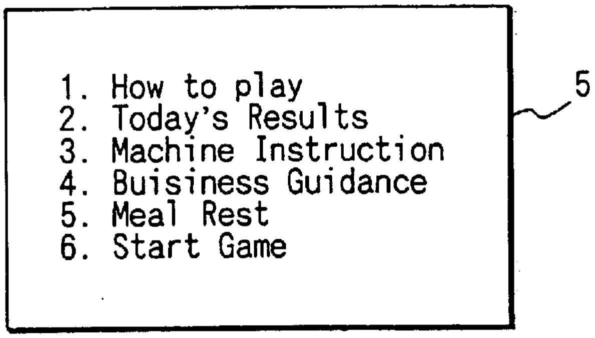
FIG. 24 is an exemplified diagram showing a menu display of the slot machine in a waiting state.

If it is in the waiting state (S51: YES), the fluorescent lamp 9 is turned off (S52), a menu as shown in FIG. 24 is displayed on the EL panel 5 (S53). Since the surface of the EL panel at the player's side forms a touch panel, the player can select an item from the menu by touching the item on the panel with his/her finger.

Next, the CPU 20*a* determines whether the player exists or not based on the data of the image processing circuit (S54), and accordingly, it determines the reason of the waiting state, i.e., whether the waiting state is set because no player exists or because no game is performed. If the player does not exist, this process ends because any operation is not further performed to the slot machine 15.

If the player exists, whether one of the items of the menu displayed on the EL panel 5 is selected, i.e., which item is selected is determined (S55). If no item is selected (S55: NO), the CPU 20*a* determines whether the deposit signal is outputted from the coin deposit sensor 140*a* (S56). The deposit of a coin means the start of a game. Therefore, when the deposit signal is inputted (S56: YES), the CPU 20*a* makes the waiting state flag F clear (S57). When the deposit signal is not inputted (S56: NO), it returns to S55. Incidentally, the return to S55 in the case of the negative determination at S56 is to make the explanation brief. If the determination at S56 is negative in practice, this process should be ended and another process should be executed.

When selection is made from the menu, the CPU 20*a* determines whether "6. START GAME" is selected (S58). When the "6. START GAME" is selected (S58: YES), it means that the player indicates his/her intension to play a game. Therefore, the waiting state is ended in this case (S57).

Figure 25A:
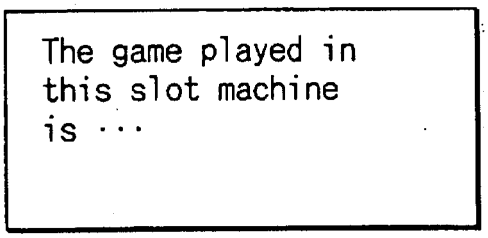
FIGS. 25A to 25C are exemplified diagrams showing displays of information such as guidance in the waiting state.
Figure 25B:
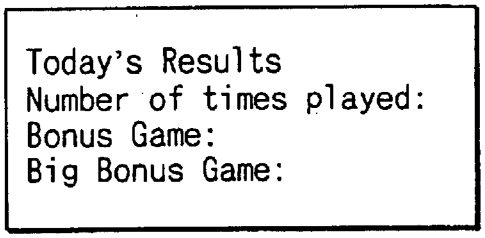
Figure 25C:
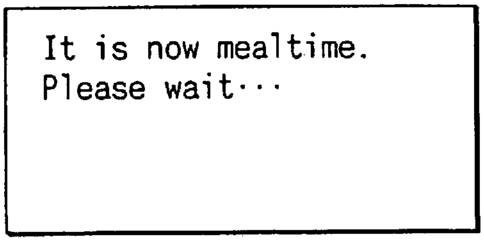

When an item other than the "6. START GAME" is selected (S56: NO), the content corresponding to the selected item is displayed on the EL panel 5 (S59). For example, if the item of "1. How to play" is selected, as shown in FIG. 25A, descriptions for explaining how to play the game in this slot machine 15 are displayed, and if the item of "2. Today's Results" is selected, as shown in FIG. 25B, hit numbers of times of the Bonus Games and the Big Bonus Games, and others are displayed. In the case of the "3. Machine Instruction", other game machines and other models of slot machines are instructed by the display. In the case of the "4. Business Guidance", the EL panel 5 displays information concerning the business configurations such as the opening time and closing time of the playground where the slot machine 15 is installed, a fixed quantity system, a lucky number system, no-limitation, or the like. In the case of the "5. Meal Rest", as shown in FIG. 25C, it is displayed that, briefly, the player using this slot machine leaves the seat due to a meal or the like. The ROM 20*b* stores the display date for the "1. How to play" and the "5. Meal Rest". The display of the "2. Today's Results" is based on the date stored in the RAM 20*c*. The contents of the "3. Machine Instruction" and the "4. Business Guidance" are retrieved from the hall computer. The CPU returns to the main process after executing S59 or aforementioned S57.

Although it is not shown, when some failures occur to the slot machine 15 in the non-waiting sate, the contents of the failures can be displayed on the EL panel 5 after the fluorescent lamp 9 is turned off. The failure contents are difficult to be displayed when the game is played. Therefore, in such a case, first, a notification for urging the player to call a shop assistant is displayed. Then, after confirming the stop of the game (for example, by detecting no deposit of an additional coin), the failure contents such as the failure portions are displayed.

Thus, in the case where the information that is not directly related to the game is displayed on the EL panel 5 in the waiting sate, since the lamp 9 is turned off and the background of the EL panel is dark, the display of the EL panel 5 is not disturbed by the overlapping back patterns on the reels and the like. Also, in the case of displaying the information other than the game, such as the failures, the information can be displayed clearly because the lamp 9 is turned off similarly.

When the EL panel 5 displays the winning lines L1 to L5, the number of credits, or the like in the playing state, the player can get collectively the important information related to the game from the EL panel 5. In consequence, the player can concentrate on the game without changing his/her viewpoint. Further, the EL panel 5 displays the aforementioned guidance and advertisement in the waiting state. Therefore, the utility value of the EL panel 5 is high, and the display contents are rich in variety both in the playing state and the waiting state. Incidentally, in the present embodiment, the CPU 20*a* functions as a state determination means (working state determination process, S51, S56, S58) and the control means (S52) as well as the front side display control means (for example, S53, S59, and the display at the game).

In the embodiment described above, the surface of the EL panel 5 forms a touch panel that is used for menu selection; however, a cursor manipulation bottom equipped with the panel 5 may perform the menu selection. Otherwise, it may dispense with the menu display, and may be so constructed that explanation of how to play, today's results, machine instruction, business guidance, news, and general advertisement are displayed in cycle.

Figure 26:
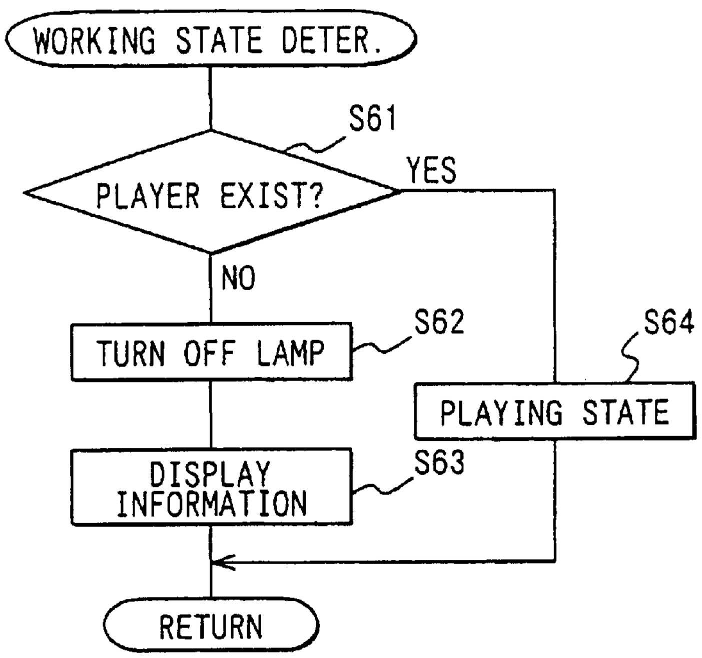
FIG. 26 is a flowchart showing another example of the working state determination process.

Also, the following construction shown in FIG. 26 is applicable. Specifically, whether the player exists or not is determined based on the image of the CCD camera 21, i.e., on the data of the image processing circuit 22 (S61). If no player exists, the fluorescent lamp 9 is turned off (S62), and the EL panel 5 displays information such as the explanation of how to play, today's results, machine instruction, business guidance, news, and general advertisement appropriately in cycle (S63). If a player exists (S61: YES), the EL panel 5 performs a playing time display (S64) (after the fluorescent lamp 9 is turned on if the waiting state continues by that time). In this case, because the waiting state is ended as soon as the player takes a seat, this process is suitable to a case where a player observes machines to select one without taking a seat.

In the embodiments described above, although the back side display means is composed of the rotational reel display device, it may be an LCD device, a CRT or a spontaneous luminescent display device such as an EL display device, and an LED device. Either of matrix type and segment type display devices is acceptable as well. In the case of the LCD device, its visibility through the front side display means can be controlled by controlling the brightness of a back light. In the CRT, the visibility is controlled by the control of its display brightness (including turning off). In the case of the spontaneous luminescent display device such as an EL display device, the display device is controlled to be brighter or darker by an ON-OFF control for supplying electricity to the device. The visibility of the luminescent display device through the front side display means changes in response to that control.

Figure 27:
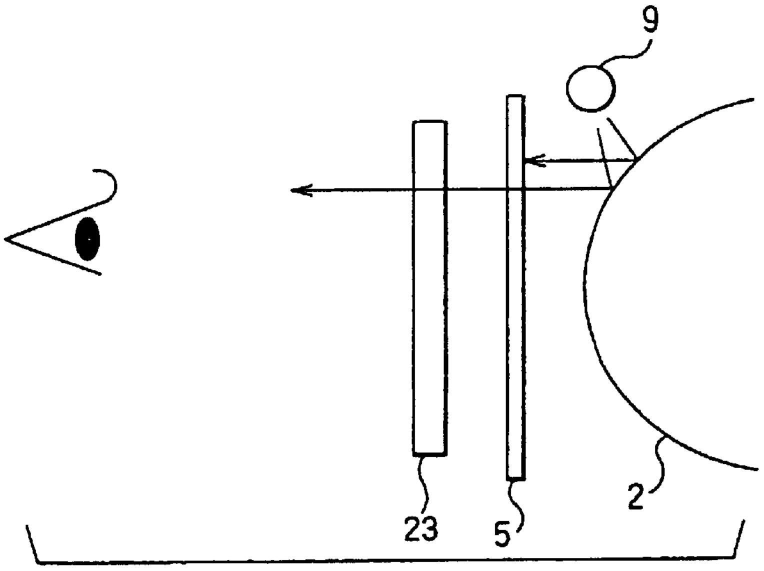
FIG. 27 is a schematic view showing a structure adopting a liquid crystal shutter in a modified embodiment.

Otherwise, as shown in FIG. 27, a transparent liquid crystal shutter 23 may be disposed in the space between the back side display means 2 (rotational reel display device) and the front side display means 5. The liquid crystal shutter 23 receives electricity when the game machine is not used so that it prevents the back side display means 2 from being recognized through the front side display means 5.

Figure 28:
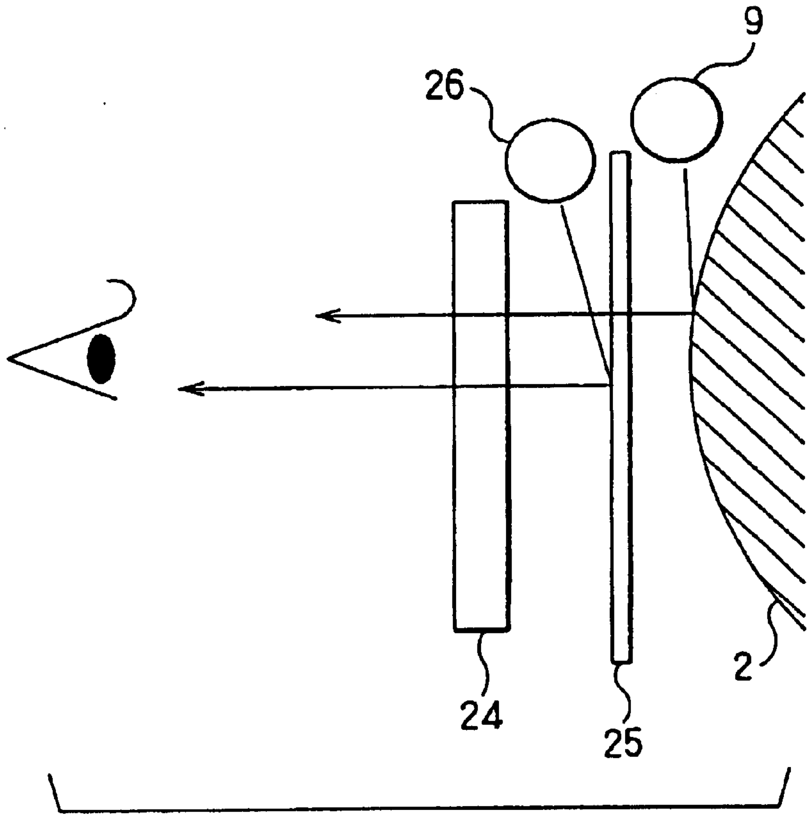
FIG. 28 is a schematic view showing a structure adopting a semi-transparent reflective plate in a modified embodiment.

Also, although the front side display means is composed of the EL panel(s) in the embodiments described above, a transmission type LCD device is applicable as well. In this case, as shown in FIG. 28, a semi-transparent reflective plate 25 is disposed between a transmission type (transparent) LCD device 24 and the back side display device (rotational reel display device) 2. A light source 26 for the LCD device 24 is preferably disposed upward of the reflective plate 25, and the light source 9 for the back side display device 2 is preferably disposed at the back side of the reflective plate 25. Accordingly, light emitted from the light source 9 is reflected by the back side display device 2 and passes through the reflective plate 25, while light emitted from the light source 26 is reflected by the reflective plate 25. Then, the player recognizes both lights through the LCD device 24.

When the back side display device is made dark, light emitted from the light source 26 is reflected by the reflective plate 25, and is recognized by the player through the LCD device 24. In this example, if the back side display device 2 is composed of a spontaneous luminescent type display device such as an EL device, the light source 9 needs not be disposed.

In the above-described embodiments, although the invention is applied to the slot machines, it can be applied to any machines such as pachinko machines that utilize combinations of patterns (letters, characters, symbols, figures, pictures etc.) to determine game conditions or to change game states. The determination may be done in combination with the pattern combinations according to the invention and a specific motion or state of a game machine (for example, a case where a ball passes through a specific region in a pachinko machine).

While the present invention has been shown and described with reference to the foregoing preferred embodiments, it will be apparent to those skilled in the art that changes in form and detail may be made therein without departing from the scope of the invention as defined in the appended claims.

What is claimed is:

1. A game machine pattern display device comprising:

a pattern display unit having a display portion for displaying a plurality of different first patterns side-by-side, the pattern display unit being capable of performing a stationary display and a varying display;

a generally flat front side display unit disposed in front of the pattern display unit and having a matrix type display portion, which includes a plurality of scanning electrodes and a plurality of data electrodes, each of the plurality of scanning electrodes intersecting at least one of the plurality of data electrodes, the front side display unit being capable of displaying a plurality of any different second patterns visibly overlapping with the plurality of first patterns, respectively, wherein the matrix type display portion of the front side display unit is entirely transparent except for the plurality of second patterns; and a display data memory means for storing display data for displaying the second patterns on the display portion of the front side display unit.

2. The pattern display device of claim 1, wherein the matrix type display portion is composed of a transparent EL panel.

3. The pattern display device of claim 2, wherein the display portion of the pattern display unit is divided into a plurality of first display regions, each of which displays one of the plurality of first patterns as the stationary display.

4. The pattern display device of claim 3, wherein each of the plurality of first patterns is one of a letter, a character, a symbol, and a picture.

5. The pattern display device of claim 1, wherein the pattern display unit has a plurality of rotation members that have the plurality of first patterns thereon, rotate to perform a scrolling display as the varying display, and stop to display the plurality of first patterns as the stationary display.

6. The pattern display device of claim 5, wherein:

the front side display unit is composed of a plurality of display panels corresponding to the plurality of rotation members.

7. The pattern display device of claim 1, wherein the plurality of first patterns forms a pattern combination that determines a game condition.

8. The pattern display device of claim 7, wherein the pattern combination of the plurality of first patterns determines the game condition in combination with the plurality of second patterns.

9. The pattern display device of claim 1, wherein:

the pattern display unit has a plurality of first display portions each of which displays a corresponding one of the plurality of first patterns, wherein the first display portions are arranged in side-by-side relationship;

the front side display unit has a plurality of second display portions each of which displays a corresponding one of the plurality of second patterns, the plurality of second display portions corresponding to the plurality of first display portions and performing overlapping displays of the plurality of second patterns and the plurality of first patterns, wherein each second display portion is generally flat and is entirely transparent except for the corresponding one of the plurality of second patterns;

at least one of a relative position between the plurality of first display portions and the plurality of second display portions, a relative relation between dimensions of the plurality of first display portions and dimensions of the plurality of second display portions, and a relative relation between dimensions of the plurality of first patterns and the dimensions of the plurality of second display portions is determined to secure correspondency between the plurality of first display portions and the plurality of second display portions even when a viewer's posture changes in an assumed range.

10. The pattern display device of claim 9, wherein the one of the relative position and the relative relations is determined to allow the plurality of first patterns to be seen completely through the plurality of second display portions.

11. The pattern display device of claim 9, wherein the one of the relative position and the relative relations is determined so that one of the plurality of first patterns is viewed only through a corresponding one of the plurality of second display portions performing an overlapping display with the one of the plurality of first patterns.

12. The pattern display device of claim 9, wherein the assumed range of the viewer's posture change is ±15 cm from a point on a center line passing through a center of the front side display unit, in a first direction parallel to the center line, and is ±30 cm from the point in a second direction perpendicular to the center line.

13. The pattern display device of claim 9, further comprising a partition wall extending in a space between adjacent two of the plurality of first display portions and in a space between adjacent two of the plurality of second display portions to secure the correspondency.

14. A pattern display device according to claim 1, wherein the pattern display unit is for displaying winning lines, and the front side display unit is for displaying a winning condition that is different from the winning lines.

15. A pattern display device according to claim 1, wherein the front side display unit is for displaying digits and characters.

16. A pattern display device according to claim 1, wherein the different first patterns and the different second patterns overlap with each other to form game patterns.

17. A pattern display device according to claim 1, further comprising a drive means for driving the front side display unit based on information supplied from the display data memory means, wherein:

when display data signal is inputted from the drive means to the front side display unit, the front side display unit displays the plurality of second patterns in such a manner that the front side display unit becomes entirely transparent except for the plurality of second patterns; and when the display data signal is not inputted from the drive means to the front side display unit, the front side display unit does not display the plurality of second patterns, so that the front side display unit becomes entirely transparent.

18. A pattern display device according to claim 1, further comprising:

a means for varying the plurality of different first patterns displayed on the pattern display unit and for stopping the varying of the plurality of different first patterns upon selecting a certain combination of patterns as the plurality of different first patterns from a plurality of corresponding patterns after a preset time period has elapsed after the varying means initiates the varying of the plurality of different first patterns; and a display data selection means for selecting a certain combination of patterns as the plurality of second patterns of the front side display unit from a plurality of corresponding patterns in such a manner that a predetermined relation is established between the plurality of second patterns and the plurality of first patterns.

19. A pattern display device according to claim 1, wherein the plurality of any different second patterns block those respective visibly overlapped portions of the plurality of different side-by-side first patterns.

20. A pattern display device according to claim 1, wherein the plurality of any different second patterns are identical to the plurality of first patterns.

21. A game machine capable of performing various overlapping displays, comprising:

a first display unit having a first display portion that displays a first combination pattern composed of a plurality of first patterns arranged side-by-side;

a generally flat transparent second display unit disposed in front of the first display unit while defining a gap with the first display unit, and has a second display portion of a matrix type, which includes a plurality of scanning electrodes and a plurality of data electrodes, each of the plurality of scanning electrodes intersecting at least one of the plurality of data electrodes, the front side display unit being capable of displaying any second pattern overlapping with the first combination pattern in such a manner that each second pattern visibly overlaps a corresponding one of the plurality of first patterns, the second display unit being entirely transparent except for each second pattern;

a display data memory means for storing display data for displaying the second pattern on the second display portion of the second display unit; and a control unit for controlling a shape of the second pattern to control overlapping display of the second pattern and the first combination pattern.

22. The game machine of claim 21, wherein the second pattern is composed of a plurality of second patterns each of which overlaps with a corresponding one of the plurality of first patterns.

23. The game machine of claim 21, wherein the second display portion of transparent second display unit includes a transparent EL panel for display the second pattern.

24. A game machine according to claim 21, further comprising a display data selection means for selecting a certain combination of patterns as the plurality of second patterns of the second display unit from a plurality of corresponding patterns in such a manner that a predetermined certain relation is established between the plurality of second patterns and the plurality of first patterns.

25. A game machine according to claim 24, further comprising a drive means for driving the second display unit based on information supplied from the display data memory means, wherein:

when a display data signal is inputted from the drive means to the second display unit, the second display unit displays the plurality of second patterns in such a manner that the second display unit becomes entirely transparent except for the plurality of second patterns; and when the display data signal is not inputted from the drive means to the second display unit, the second display unit does not display the plurality of second patterns, so that the second display unit becomes entirely transparent.

26. The game machine of claim 21, wherein the any second pattern blocks the visibly overlapped corresponding one of the plurality of first patterns.

27. The game machine of claim 21, wherein each second pattern is identical to the corresponding one of the plurality of first patterns.

28. A game machine pattern display device comprising:

a pattern display unit having a display portion for displaying a plurality of different first patterns side-by-side, the pattern display unit being capable of performing a stationary display and a varying display; and a generally flat front side display unit of a matrix type disposed in front of the pattern display unit and capable of displaying a plurality of different second patterns visibly overlapping the plurality of first patterns, respectively, the front side display unit being capable of performing a stationary display and a varying display, the front side display unit including a plurality of scanning electrodes and a plurality of data electrodes, each of the plurality of scanning electrodes intersecting at least one of the plurality of data electrodes, and being entirely transparent except for the plurality of second patterns, the plurality of first patterns forming a pattern combination that determines a game condition in combination with the plurality of second patterns.

29. A pattern display device according to claim 28, further comprising a means for stopping a change in the display of the pattern display unit and then stopping a change in the display of the front side display unit.

30. A pattern display device according to claim 28, further comprising:

a display data memory means for storing display data for displaying the second patterns on the front side display unit; and a drive means for driving the front side display unit based on information supplied from the display data memory means, wherein:

when a display data signal is inputted from the drive means to the front side display unit, the front side display unit displays the plurality of second patterns in such a manner that the front side display unit becomes entirely transparent except for the plurality of second patterns; and when the display data signal is not inputted from the drive means to the front side display unit, the front side display unit does not display the plurality of second patterns, so that the front side display unit becomes entirely transparent.

31. A pattern display device according to claim 28, wherein the plurality of different second patterns respectively block those visibly overlapped plurality of first patterns.

32. A pattern display device according to claim 28, wherein the plurality of different second patterns are identical to the plurality of first patterns.

33. A game machine pattern display device comprising:

a pattern display unit having a display portion for displaying a plurality of first patterns side-by-side, the pattern display unit being capable of performing a stationary display and a varying display; and a generally flat front side display unit of a matrix type disposed in front of the pattern display unit and including a plurality of scanning electrodes and a plurality of data electrodes, each of the plurality of scanning electrodes intersecting at least one of the plurality of data electrodes, the front side display unit being capable of displaying a plurality of second patterns visibly overlapping the plurality of first patterns, wherein the plurality of second patterns includes at least one pattern having an outline that is substantially the same as that of one of the plurality of first patterns, and the front side display unit being entirely transparent except for the plurality of second patterns.

34. A pattern display device according to claim 33, further comprising a display data selection means for selecting a certain combination of patterns as the plurality of second patterns of the front side display unit from a plurality of corresponding patterns in such a manner that a predetermined relation is established between the plurality of second patterns and the plurality of first patterns.

35. A pattern display device according to claim 33, wherein the plurality of second patterns respectively block those visibly overlapped plurality of first patterns.

36. A pattern display device according to claim 33, wherein the plurality of different second patterns are identical to the plurality of first patterns.

37. A game machine pattern display device comprising:

a pattern display unit having a display portion for displaying a plurality of first patterns side-by-side, the pattern display unit being capable of performing a stationary display and a varying display; and a generally flat front side display unit of a matrix type disposed in front of the pattern display unit and including a plurality of scanning electrodes and a plurality of data electrodes, each of the plurality of scanning electrodes intersecting at least one of the plurality of data electrodes, the front side display unit being capable of displaying a plurality of second patterns visibly overlapping the plurality of first patterns, respectively, wherein the plurality of second patterns includes at least one pattern other than a straight line, and the front side display unit being entirely transparent except for the plurality of second patterns.

38. A pattern display device according to claim 37, wherein the plurality of second patterns respectively block those visibly overlapped plurality of first patterns.

39. A pattern display device according to claim 37, wherein the plurality of different second patterns are identical to the plurality of first patterns.

* * * * *

UNITED STATES PATENT AND TRADEMARK OFFICE

CERTIFICATE OF CORRECTION

PATENT NO. : 7,204,753 B2
APPLICATION NO. : 09/793720
DATED : April 17, 2007
INVENTOR(S) : Masaaki Ozaki et al.

It is certified that error appears in the above-identified patent and that said Letters Patent is hereby corrected as shown below:

Title Page

Correct the Assignee (item 73) of the original Letters Patent to read as:

(73) Assignees: DENSO CORPORATION, Kariya-city (JP)
Yamasa Co., Ltd., Okayama-ken (JP)

Signed and Sealed this

Twenty-third Day of September, 2008

JON W. DUDAS
*Director of the United States Patent and Trademark Office*